(12) United States Patent
Yazami et al.

(10) Patent No.: US 8,232,007 B2
(45) Date of Patent: Jul. 31, 2012

(54) ELECTROCHEMISTRY OF CARBON SUBFLUORIDES

(75) Inventors: Rachid Yazami, Los Angeles, CA (US); André Hamwi, Clermont-Ferrand (FR)

(73) Assignees: California Institute of Technology, Pasadena, CA (US); Centre National de la Recherche Scientifique (C.N.R.S.), Paris (FR); Universite Blaise Pascal, Clermont-Ferrand (FR)

( * ) Notice: Subject to any disclaimer, the term of this patent is extended or adjusted under 35 U.S.C. 154(b) by 465 days.

(21) Appl. No.: 11/677,541

(22) Filed: Feb. 21, 2007

(65) Prior Publication Data

US 2007/0231697 A1    Oct. 4, 2007

Related U.S. Application Data

(63) Continuation-in-part of application No. 11/675,308, filed on Feb. 15, 2007, which is a continuation-in-part of application No. 11/422,564, filed on Jun. 6, 2006, now Pat. No. 7,563,542, application No. 11/677,541, which is a continuation-in-part of application No. PCT/US07/62243, filed on Feb. 15, 2007, said application No. 11/422,564 is a continuation-in-part of application No. 11/253,360, filed on Oct. 18, 2005, now abandoned.

(60) Provisional application No. 60/775,110, filed on Feb. 21, 2006, provisional application No. 60/775,559, filed on Feb. 22, 2006, provisional application No. 60/900,409, filed on Feb. 9, 2007, provisional application No. 60/774,262, filed on Feb. 16, 2006, provisional application No. 60/784,957, filed on Mar. 21, 2006, provisional application No. 60/784,960, filed on Mar. 20, 2006, provisional application No. 60/724,084, filed on Oct. 5, 2005.

(51) Int. Cl.
*H01M 4/58* (2010.01)
*H01M 4/02* (2006.01)
*H01M 4/60* (2006.01)
*H01M 6/00* (2006.01)

(52) U.S. Cl. ............. 429/231.7; 429/209; 429/212; 29/623.1

(58) Field of Classification Search ............ None
See application file for complete search history.

(56) References Cited

U.S. PATENT DOCUMENTS 3,536,532 A   10/1970   Watanabe et al.
3,700,502 A   10/1972   Wantanabe et al.
(Continued)

FOREIGN PATENT DOCUMENTS

CN    1092742    9/1994
(Continued)

OTHER PUBLICATIONS

Abidi et al. (2003) "Alkali Metal Ion Complexes of Functionalized Calizarenes—Competition Between Pendent Arm and Anion Bond to Sodium," *Org. Biomol. Chem.* 1:3144-3146.

(Continued)

*Primary Examiner* — Barbara Gilliam
*Assistant Examiner* — Adam A Arciero
(74) *Attorney, Agent, or Firm* — Greenlee Sullivan P.C.

(57) ABSTRACT

Subfluorinated carbonaceous materials obtained through direct fluorination of graphite or coke particles are provided. One set of subfluorinated carbonaceous materials has an average chemical composition $CF_x$ in which $0.63 < x \leq 0.95$, $0.66 < x \leq 0.95$ or $0.7 < x \leq 0.95$. The subfluorinated carbonaceous materials are capable of electrochemical performance superior to commercial CF at relatively high rates of discharge.

16 Claims, 20 Drawing Sheets

U.S. PATENT DOCUMENTS

| | | |
|---|---|---|
| 3,796,604 A | 3/1974 | Gabano et al. |
| 3,796,605 A | 3/1974 | Dechenaux et al. |
| 3,956,018 A | 5/1976 | Kozawa |
| 4,052,539 A | 10/1977 | Shropshire et al. |
| 4,119,655 A | 10/1978 | Hulme |
| 4,247,608 A | 1/1981 | Watanabe et al. |
| 4,431,567 A | 2/1984 | Gestaut et al. |
| 4,438,086 A * | 3/1984 | Aramaki et al. .............. 423/448 |
| 4,609,598 A | 9/1986 | Tucholski et al. |
| 4,681,823 A | 7/1987 | Tung |
| 4,753,786 A | 6/1988 | Watanabe et al. |
| 4,830,938 A | 5/1989 | McCullough et al. |
| 4,840,859 A | 6/1989 | Williams et al. |
| 4,865,931 A | 9/1989 | McCullough et al. |
| 5,106,606 A | 4/1992 | Endo et al. |
| 5,114,811 A | 5/1992 | Ebel et al. |
| 5,116,592 A | 5/1992 | Weinberg |
| 5,151,162 A | 9/1992 | Muller et al. |
| 5,175,066 A | 12/1992 | Hamwi et al. |
| 5,437,943 A | 8/1995 | Fujii et al. |
| 5,443,930 A | 8/1995 | Shoji et al. |
| 5,518,836 A | 5/1996 | McCullough |
| 5,532,083 A | 7/1996 | McCullough |
| 5,534,370 A | 7/1996 | Kita et al. |
| 5,702,844 A | 12/1997 | Bernard et al. |
| 5,705,689 A | 1/1998 | Lee et al. |
| 5,712,062 A | 1/1998 | Yamana et al. |
| 5,916,642 A | 6/1999 | Chang |
| 5,968,683 A | 10/1999 | Kolb |
| 6,022,643 A | 2/2000 | Lee et al. |
| 6,068,921 A | 5/2000 | Yamana et al. |
| 6,077,624 A | 6/2000 | Mitchell et al. |
| 6,100,324 A | 8/2000 | Choi et al. |
| 6,120,941 A | 9/2000 | Lee et al. |
| 6,203,814 B1 | 3/2001 | Fisher et al. |
| 6,245,465 B1 | 6/2001 | Angell et al. |
| 6,268,430 B1 | 7/2001 | Choi et al. |
| 6,306,540 B1 | 10/2001 | Hiroi et al. |
| 6,334,939 B1 | 1/2002 | Zhou et al. |
| 6,352,798 B1 | 3/2002 | Lee et al. |
| 6,358,649 B1 | 3/2002 | Yazami et al. |
| 6,479,192 B1 | 11/2002 | Chung et al. |
| 6,482,550 B1 | 11/2002 | Imachi et al. |
| 6,489,055 B1 | 12/2002 | Ichihashi et al. |
| 6,528,208 B1 | 3/2003 | Thackeray et al. |
| 6,586,133 B1 | 7/2003 | Teeters et al. |
| 6,589,299 B2 | 7/2003 | Missling et al. |
| 6,638,662 B2 | 10/2003 | Kaneda et al. |
| 6,649,033 B2 | 11/2003 | Yagi et al. |
| 6,709,566 B2 | 3/2004 | Cumings et al. |
| 6,713,214 B2 | 3/2004 | Koga et al. |
| 6,743,547 B2 | 6/2004 | Gan et al. |
| 6,743,549 B1 | 6/2004 | Doyle et al. |
| 6,767,671 B2 | 7/2004 | Itagaki et al. |
| 6,841,610 B2 | 1/2005 | Yanagisawa |
| 6,844,115 B2 | 1/2005 | Gan et al. |
| 6,852,446 B2 | 2/2005 | Barbarich |
| 6,852,449 B2 | 2/2005 | Nagata et al. |
| 6,926,991 B2 | 8/2005 | Gan et al. |
| 6,939,383 B2 | 9/2005 | Eastin et al. |
| 6,958,198 B2 | 10/2005 | Iwamoto et al. |
| 6,986,967 B2 | 1/2006 | Barton et al. |
| 7,005,211 B2 | 2/2006 | Kim et al. |
| 7,074,523 B2 | 7/2006 | Arai et al. |
| 7,087,348 B2 | 8/2006 | Holman et al. |
| 7,563,542 B2 | 7/2009 | Yazami et al. |
| 7,794,880 B2 | 9/2010 | Yazami et al. |
| 2002/0061441 A1 | 5/2002 | Ogura et al. |
| 2002/0081492 A1 | 6/2002 | Gan et al. |
| 2002/0106558 A1 | 8/2002 | Maske et al. |
| 2002/0119371 A1 | 8/2002 | Haug et al. |
| 2002/0127171 A1 | 9/2002 | Smalley et al. |
| 2002/0177041 A1 | 11/2002 | Worle et al. |
| 2002/0182506 A1 | 12/2002 | Cagle |
| 2003/0003370 A1 | 1/2003 | Arai et al. |
| 2003/0049535 A1 | 3/2003 | Ohta et al. |
| 2003/0108799 A1 | 6/2003 | Lascaud et al. |
| 2003/0158310 A1 | 8/2003 | Asano et al. |
| 2003/0224168 A1 | 12/2003 | Mack et al. |
| 2004/0013814 A1 | 1/2004 | Guerfi et al. |
| 2004/0131859 A1 | 1/2004 | Chen et al. |
| 2004/0048160 A1 | 3/2004 | Omaru |
| 2004/0058247 A1 | 3/2004 | Omaru |
| 2004/0091783 A1 | 5/2004 | Cagle |
| 2004/0106047 A1 | 6/2004 | Mie et al. |
| 2004/0258986 A1 | 12/2004 | Shen et al. |
| 2005/0006623 A1 | 1/2005 | Wong et al. |
| 2005/0011710 A1 | 1/2005 | Hitchcock et al. |
| 2005/0026044 A1 | 2/2005 | Koike et al. |
| 2005/0069778 A1 | 3/2005 | Bonnet et al. |
| 2005/0118512 A1 | 6/2005 | Onuki et al. |
| 2005/0123835 A1 | 6/2005 | Sun |
| 2005/0170251 A1 | 8/2005 | Jung et al. |
| 2005/0207966 A1 | 9/2005 | Zaghib |
| 2005/0227146 A1 * | 10/2005 | Ghantous et al. .......... 429/231.7 |
| 2006/0269834 A1 | 11/2006 | West et al. |
| 2007/0037063 A1 | 2/2007 | Choi et al. |
| 2007/0077493 A1 | 4/2007 | Yazami et al. |
| 2007/0077495 A1 | 4/2007 | Yazami et al. |
| 2007/0218364 A1 | 9/2007 | Whitacre et al. |
| 2007/0231696 A1 | 10/2007 | Yazami et al. |
| 2009/0111021 A1 | 4/2009 | Yazami et al. |
| 2009/0258294 A1 | 10/2009 | Yazami et al. |

FOREIGN PATENT DOCUMENTS

| | | |
|---|---|---|
| EP | 0 169 407 | 1/1986 |
| EP | 0 776 053 | 5/1997 |
| EP | 1 019 975 | 7/2000 |
| EP | 1 028 476 | 8/2000 |
| EP | 1 205 003 | 5/2002 |
| EP | 1 230 708 | 8/2002 |
| EP | 1 236 239 | 9/2002 |
| EP | 1 520 318 | 4/2005 |
| EP | 1 551 069 | 7/2005 |
| FR | 2 856 674 | 12/2004 |
| FR | 2856674 | 12/2004 |
| JP | 59087763 A | 5/1984 |
| JP | 11214037 | 8/1999 |
| JP | 2000106188 | 4/2000 |
| JP | 2000200604 | 7/2000 |
| JP | 2003187799 | 7/2003 |
| JP | 2005113361 | 4/2005 |
| JP | 2005-285440 | 10/2005 |
| JP | 2005285440 | 10/2005 |
| JP | 2006-236891 | 9/2006 |
| JP | 2007-087688 | 4/2007 |
| SU | 584369 | 12/1977 |
| WO | WO 97/02580 | 1/1997 |
| WO | WO 99/18624 | 4/1999 |
| WO | WO 99/34470 | 7/1999 |
| WO | WO 01/09972 | 2/2001 |
| WO | WO 01/33656 | 5/2001 |
| WO | WO 01/41246 | 6/2001 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO 2004/001888 | 12/2003 |
| WO | WO 2004/051784 | 6/2004 |
| WO | WO 2004/088769 | 10/2004 |
| WO | WO 2004/090921 | 10/2004 |
| WO | WO 2004/096704 | 11/2004 |
| WO | WO 2006/128174 | 11/2006 |
| WO | WO 2007/040547 | 4/2007 |
| WO | WO 2007/098369 | 8/2007 |
| WO | WO 2007/098478 | 8/2007 |
| WO | WO 2007/126436 | 11/2007 |

OTHER PUBLICATIONS

Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.

Arora et al. (2004) "Battery Separators," *Chem. Rev.*, 104:4419-4462.

Audier et al. (1981) "Crystallographic Orientations of Catalytic Particles in Filamentous Carbon; Case of Simple Conical Particles," *J. Cryst. Growth* 55:549-556.

Banerjee et al. (2003) "Rational Chemical Strategies for Carbon Nanotube Functionalization," *Chem. Eur. J.* 9:1898-1908.

Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.

Beer et al. (2003) "Transition Metal and Organometallic Anion Complexation Agents," *Coord. Chem. Rev.* 240:167-189.

Bertani et al. (1999) "$^{19}F/^{29}Si$ Distance Determination in Fluoride-Containing Octadecasil by Hartmann-Hahn Cross-Polarization Under Fast Magic-Angle Spinning," *Solid State Magn. Res.* 13:219-229.

Bethune et al. (1993) "Cobalt-Catalyzed Growth of Carbon Nanotubes with Single-Atomic0Layer Walls," *Nature* 363:605-607.

Bitter et al. (1998) "Studies on Calix(aza)crowns, II. Synthesis of Novel Proximal Doubly Bridged Calix[4]arenes by Intramolecular Ring Closure of Syn 1,3- and 1,2- to ω-Chloraolkylamides," *Tetrahedron* 54:3857-3870.

Blesa et al. (2006) "Bis(calixcrown)tetrathiafuvalene Receptors," *Chem. Eur. J.* 12:1906-1914.

Blumberg, W.E. (1960) "Nuclear Spin Lattice Relaxation Caused by Paramagnetic Impurities," *Phys. Rev.* 119:79-84.

Bonnamy et al. (1999) "Carbonization of Various Precursors. Effect of Heating Rate: Part II: Transmission Electron Microscopy and Physicochemical Studies," *Carbon* 37:1707-1724.

Bonnamy et al. (1999) "Carbonizaion of Various Precursors. Effect of Heating Rate: Part I: Optical Microscopy Studies," *Carbon* 37:1691-1705.

Bourderau et al. (1999) "Amorphous Silicon as a Possible Anode Material for Li-ion Batteries," *J. Power Sources* 81:233-236.

Bruce, G. (2005) "Development of a CFx D Cell for Man Portable Applications," In; Joint Service Power Expo, Power Point Presentation.

Bulusheva et al. (2002) "Atomic Arrangement and Electronic Structure of Graphite Fluoride C2F," *Phys. Low-Dim. Struct.* 7/8:1-14.

Cassell et al. (1999) "Large Scale CVD Synthesis of Single-Walled Carbon Nanotubes," *J. Phys. Chem. B* 103(31):6484-6492.

Chamssedine et al. (2007) "Reactivity of Carbon Nanofibers with Fluorine Gas," *Chem. Mater.* 19:161-172.

Charlier et al. (1993) "First Principles Study of Graphite Monofluoride $(CF)_n$," *Phys. Rev. B*, 47:16162-16168.

Chevalier et al. (1994) "Anionic Intercalation in $La_2CuO_4$ Oxide by Fluorine or Chlorine Treatment," *Mol. Cryst. Liq. Cryst.* 244:135-142.

Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.

Chiang et al. (2001) "Purification and Characterization of Single-Walled Carbon Nanotubes (SWNTs) Obtained from the Gas-Phase Decomposition of CO (HiPco Process) *J. Phys. Chem. B* 105:8297-8301.

Chieu et al. (1982) "Raman Studies of Benzene-Derived Graphite Fibers," *Phys. Rev. B* 26:5867-.

Chung et al. (1995) "Electrochemical Behavior of Calix[4]arenediquinones and Their Cation Binding Properties," *J. Electroanalytical Chem.* 396:431-439.

Dahn et al. (2000) "Energy and Capacity Projections for Practical Dual-Graphite Cells," *J. Electrochem. Soc.* 147(3):899-901.

Davidson (2003) "Lithium Batteries, Molecular Expressions, Electricity and Magnetism," Florida State Univ., http://micro.magnet.fsu.edu/electromag/electricity/batteries/lithium.html , Downloaded Dec. 15, 2005.

De Jong et al. (2000) "Carbon Nanofibers: Catalytic Synthesis and Applications," *Catalysis Reviews-Science and Engineering* 42:481-510.

Derf et al. (2001) "Tetrathiafulvalene Crowns: Redox Switchable Ligands," *Chem. Eur. J.* 7(2):447-455.

Dietrich (1993) "Design of Anion Receptors: Applications," *Pure Apple. Chem.* 65(7):1457-1464.

Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.

Dresselhaus et al. (1981) "Intercalation Compounds of Graphite," *Adv. Phys.* 30(2):139-326.

Dubois et al. (2006) "EPR and Solid-State NMR Studies of Poly(dicarbon monofluoride) $(C_2F)_n$," *J. Phys. Chem. B*. 110:11800-11808.

Dubois et al. (2004) "NMR and EPR Studies of Room Temperature Highly Fluorinated Graphite Heat-Treated Under Fluorine Atmosphere," *Carbon* 42:1931-1940.

Duclaux, L. (2002) "Review of the Doping of Carbon Nanotubes (Multiwalled and Single-Walled)," *Carbon* 40:1751-1764.

Duesberg et al. (1998) "Chromatographic Size Separation of Single-Wall Carbon Nanotubes," *Appl. Phys. A* 67:117-119.

Duijvestjn et al. (1983) "$^{13}C$ NMR Spectroscopy in Diamonds Using Dynamic Nuclear Polarization," *Chem. Phys. Lett.* 102:25-28.

Ebert et al. (1974) "Carbon Monofluoride. Evidence for a Structure Containing an Infinite Array of Cyclohexane Boats," *J. Am. Chem Soc.*, 96:7841-7842.

Ehrlich, G.M. (2001) "Lithium-Ion Batteries," In; *Handbook of Batteries*, 3$^{rd}$ ed., Ch. 35, New York, McGraw Hill, pp. 35.1-35.90.

Endo, M. (1988) "Grow Carbon Fibers in the Vapor Phase," *Chemtech* :568-576.

Feng et al. (2003) "Removal of Some Impurities From Carbon Nanotubes," *Chem. Phys. Lett.* 375:645-648.

Frank et al. (1975) "Preparation and Crystal-Structure of $Li_3SN_5$ and Structural Relations Between Phases of Systems Li-SN and Li-PB," *Z. Naturforsch. B* 30:316-322.

Fujimoto (1997) "Structure Analysis of Graphite Fluoride by Rietveld Method," *Carbon*, 35:1061-1065.

Furdin, G. (1998) "Exfoliation Process and Elaboration of New Carbonaceous Materials," *Fuel* 77(6):479-485.

Giraudet et al. (2006) "Solid-State NMR Studies of Covalent Graphite Fluorides $(CF)_n$ and $(C_2F)_n$," *J. Phys. Chem. Solids* 67(5-6):1100-1105.

Giraudet et al. (2005) "Solid-State $^{19}F$ and $^{13}C$ NMR of Room Temperature Fluorinated Graphite and Samples Thermally Treated Under Fluorine: Low-Field and High-Resolution Studies," *J. Solid State Chem.* 118:1262-1268.

Giraudet et al. (2005) "Solis-State NMR ($^{19}F$ and $^{13}C$) Study of Graphite Monofluoride $(CF)_n$: 19F Spin; Lattice Magnetic Relaxation and 19F/13C Distance Determination by Hartmann-Hahn Cross Polarization," *J. Phys. Chem. B* 109:175-181.

Gladyshevskii et al. (1964) "New Examples of the Structural Type $Li_{22}Pb_5$," *Sov. Phys. Crystallogr.* 9(3):269-271.

Gokel et al. (2000) "Experimental Evidence for Alkali Metal Cation—π Interactions," *Eur. J. Chem.* :2967-2978.

Graetz et al. (2003) "Highly Reversible Lithium Storage in Nanostructured Silicon," *Electrochemical and Solid-State Letters*, 6(9) A194-A197.

Guerin et al. (2004) "Hybrid-Type Graphite Fluoride as Cathode Material in Primary Lithium Batteries," *Electrochem. Solid-State Lett.* 7(6):A159-A162.

Gupta et al. (2001) "Raman Scattering Study of Highly Fluorinated Graphite," *J. Fluorine Chem.*, 110:145-151.

Gupta et al. (2003) "A Study on the Formation Mechanism of Graphite Fluorides by Raman Spectroscopy," *J. Fluorine Chem.* 120:143-150.

Hafner et al. (1998) "Catalytic Growth of Single-Wall Carbon Nanotubes From Metal Particles," *Chem. Phys. Lett.* 296(1-2):195-202.

Hagaman et al. (1998) "Solid-State $^{13}C$ and $^{19}F$ NMR Characterization of Fluorinated Charcoal," *Energy & Fuel* 12:399-408.

Hamwi et al. (1997) "Fluorination of Carbon Nanotubes," *Carbon* 35:723-728.

Hamwi et al. (1998) "Electrochemical Properties of Carbon Nanotube Fluorides in a Lithium Cell System," *Mol. Cryst. Liq. Cryst.* 310:185-190.

Hamwi, A. (1996) "Fluorine Reactivity with graphite and Fullerenes. Fluoride Derivatives and Some Practical Electrochemical Applications," *J. Phys. Chem. Solids* 57(6-8):677-688.

Hany et al. (1997) "Low-Temperature Carbon Fluoride for High Power Density Lithium Primary Batteries," *J. Power Sources* 68(2):708-710.

Harris, P. (1999) *Carbon Nanotubes and Related Structures*, Cambridge University Press, Cambridge, pp. 103.

Harutyunyuan et al. (2002) "Purification of Single-Wall Carbon Nanotubes by Selective Microwave Heating of Catalyst Particles," *J. Phys. Chem. B* 106:8671-8675.

Holzinger et al. (2000) "A New Purification Method for Single-Wall Carbon Nanotubes (SWNTs)," *Appl. Phys. A* 70:599-602.

Hopf et al. (1972) "Structure of the Lithium Germanide Phase $Li_7Ge_2$," *Z. Naturforsch. B* 22:1157-1160.

Iijima, S. (1991) "Helical Microtubules of Graphite Carbon," *Nature* 354:56-58.

Iijima et al. (1993) "Single-Shell Carbon Nanotunbes 1-nm Diameter," *Nature* 363:603-605.

Inagaki et al. (2004) "Exfoliation Process of Graphite Via Intercalation Compounds with Sulfuric Acid," *J. Phys. Chem. Solids* 65:133-137.

Inagaki et al. (1994) "Graphite Exfoliation at Room Temperature and its Structural Annealing," *Carbon* 32(7):1253-1257.

International Search Report Corresponding to International Application No. PCT/US07/62518, Mailed Sep. 27, 2007.

International Search Report Corresponding to International Application No. PCT/US05/37871, Mailed Apr. 19, 2006.

International Search Report Corresponding to International Application No. PCT/US05/08897, Mailed Aug. 28, 2006.

International Search Report corresponding to International Application No. PCT/US/03/28395, Mailed Feb. 8, 2005.

Jacobs (2005) Lithium Battery Basics, Machine Design, www.machinedesign.com/ASP/strArticleID/55501/strSite/MDSite/view Selected Art.asp.

Jacobs (2005) "Long-lasting Lithiums," *Electron. Comm Technol.*, http://dataweek/co.za/Article.ASP?pklArticleID=1847&pkIIssueID=455.

Johansson, P. (2006) "Intrinsic Anion Oxidation Potentials," *J. Phys. Chem.* 110:12077-12080.

Johnson et al. (1965) "The Crystal Structure of $Li_{15}Ge_4$," *Acta. Cryst.* 18:131-132.

Journet et al. (1997) "Large-Scale Production of Single-Walled Carbon Nanotubes by the Electric-Arc Technique," *Nature* 388:756-758.

Kelly et al. (1999) "Insight into the Mechanism of Sidewall Functionalization of Single-Walled Nanotubes: An STM Study," *Chem. Phys. Lett.* 313:445-450.

Kita et al. (1979) "Chemical Composition and Crystal Structure of Graphite Fluoride," *J. Am. Chem. Soc.*, 101:3832-3841.

Kitiyanan et al. (2000) "Controlled Production of Single-Wall Carbon Nanotubes by Catalytic Decomposition of CO on Bimetallic Co—Mo Catalysts," *Chem. Phys. Lett.* 317(3-5):497-503.

Knight et al. (1980) "Characterization of Diamond Films by Raman Spectroscopy," *J. Mater Res.* 4:385-393.

Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.

Krawietz et al. (1998) "Characterization of Poly(carbon monofluoride) by 19F and 19F to 13C Cross Polarization MAS NMR Spectroscopy," *Chem. Commun.* 19:2151-2151.

Kuga et al. (1993) "Laser-Assisted Exfoliation of Potassium-Ammonia-Graphite Intercalation Compounds," *Carbon* 31(1):201-204.

Kuriakose et al. (1965) "Kinetics of Reactions of Elemental Fluorine. IV. Fluorination of Graphite," *J. Phys. Chem.* 69:2272-2274.

Lam et al. (Jun. 27, 2005) "Physical Characteristics and Rate Performance $(CF_x)_n$ (0.33<x<0.66) in Lithium Batteries," *J. Power Sci.* 153:354-359.

Lee et al. (2003) "The Physiochemical Characteristics of Modified Carbon Fibers by Fluorination," *Korean J. Chem. Eng.* 20(1):151-156.

Lee et al. (2004) "Synthesis of a Series of Fluorinated Boronate Compounds and Their Uses as Additives in Lithium Battery Electrolytes," *J. Electrochem. Soc.* 151(9):A1429-1435.

Lee et al. (Aug. 1998) "The Synthesis of a New Family of Boron-Based Anion Receptors and the Study of Their Effect on Ion Pair Dissociation and Conductivity of Lithium Salts in Nonaqueous Solutions," *J. Electrochem. Soc.* 145(8):2813-2818.

Li et al. (2000) "The Crystal Structural Evolution of Nano-Si Anode Caused by Lithium Insertion and Extraction at Room Temperature," *Solid State Ionics*, 135:181-191.

Li et al. (1999) "A High Capacity Nano-Si Composite Anode Material for Lithium Rechargeable Batteries," *Electrochemical and Solid-State Letters*, 2(11) 547-549.

Limthongkul et al. (2003) "Electrochemically-Driven Solid-State Amorphization in Lithium-Silicon Alloys and Implications for Lithium Storage," *Acta Materialia* 51:1103-1113.

Linden et al. (2001) "Lithium Batteries," In; *Handbook of Batteries*, $3^{rd}$ ed., Ch. 14, New York, McGraw Hill, pp. 14.1-14.99.

Liu et al. (1998) "Fullerene Pipes," *Science* 280:1253-1256.

Liu et al. (2005) "Versatile Self-Complexing Compounds Based on Covalently Linked Donor-Acceptor Cyclophanes," *Chem. Eur. J.* 11:369-385.

Magasinski et al. (2002) "Graphitization, Intercalation, and Exfoliation of Cokes and Anthracites: A Comparative Study," *Fuel Processing Technol.* 79(3):259-264.

Mark et al. (1986) "Electron-Transfer Polymers," In; *Encyclopedia of Polymer Science and Engineering*, $2^{nd}$ ed., vol. 5, Wiley, pp. 725-755.

Menges et al. (1969) "Crystal Structure of Lithium Germanide, A New Type of Three-Dimensional Bonding of Element(IV) Atoms," *Z. Naturforsch. B* 24:1351-1352.

Messaoudi et al. (1991) "Chemical-Reduction of $FeCl_3$-Graphite Intercalation Compounds with Potassium Naphalene Complex in Tetrahydrofuran," *J. Mater. Chem.* 1(5):735-738.

Mickelson et al. (1998) "Fluorination of Single-Wall Carbon Nanotubes," *Chem. Phys. Lett.* 296:188-194.

Mitkin et al. (2002) "X-ray Electron- and Auger-Spectroscopic Study of Superstoichiometric Fluorographite-Like Materials," *J. Struct. Chem.*, 43:843-855.

Mittkin et al. (2003) "Types of Inorganic Fluorocarbon Polymer Materials and Structure-+property Correlation Problems," *J. Struct. Chem.* 44:82-115 (Translated from *Zhurnal Structunoi Khimii* 44:99-138).

Mochida et al. (2000) "Chemistry of Synthesis, Structure, Preparation and Application of Aromatic-Derived Mesophase Pitch," *Carbon* 38:305-328.

Morita et al. (1980) "Evaluation of Cathode Materials for the Lithium/Carbonmonofluride Battery," *J. Power Sources* 5:111-125.

Nakajima et al. (1999) "Electrochemical Behavior of Surface-Fluorinated Graphite," *Electrochem. Acta*, 44:2879-2888.

Nakajima et al. (1991) "Synthesis and Structures of Graphite Fluorides," In; *Graphite Fluorides and Carbon-Fluorine Compounds*, CRC Press, Boca Raton, FL, Ch. 2, pp. 11-41.

Nakajima et al. (1991) "Lithium-Graphite Fluoride Battery," In; *Graphite Fluorides and Carbon-Fluorine Compounds*, CRC Press, Boca Raton, FL, Ch. 4, pp. 77-109.

Nakajima, T. (1995) "Synthesis, Structure, and Physicochemical Properties of Fluorine-Graphite Intercalation Compounds," In; *Fluorine-Carbon and Fluoride-Carbon Materials*, Marcel Dekker, New York, pp. 1-31.

Nakamizo et al. (1974) "Laser Raman Studies on Carbons," *Carbon* 12:259-267.

Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.

Nasimbulin et al. (2005) "Synthesis of Nanoparticles Using Vapor-Phase Decomposition of Copper(II) Acetylacetonate," *Colloid J.* 67(1):1-20.

Nazri, M. (2004) "Liquid Electrolytes: Some Theoretical and Practical Aspects," In; *Lithium Batteries Science and Technology*, Ch. 17, Kluer Academic Publishers, pp. 509-573.

Nemanich et al. (1977) "Raman Scattering from Intercalated Donor Compounds of Graphite," *Phys. Rev. B* 16(6):2965-2972.

Nesper (1990) "Structure and Chemical Bonding in Zintl-Phases Containing Lithium," *Prog. Solid-State Chem.* 20:1-45.

Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.

Ohara et al. (2003) "Li Insertion/Extraction Reaction at a Si Film Evaporated on a Ni Foil," *Journal of Power Sources*, 119-121.

Okotrub et al. (2000) "Fluorinated Cage Multiwall Carbon Nanoparticles," *Chem. Phys. Lett.* 323:231-236.

Osswald et al. (2005) "Elimination of D-Band in Raman Spectra of Double-Wall Carbon Nanotubes by Oxidation," *Chem. Phys. Lett.* 402:422-427.

Panich A.M. (1999) "Nuclear Magnetic Resonance Study of Fluorine-Graphite Intercalation Compounds and Graphite Flourides," *Synth. Matals* 100:169-185.

Panich et al. (2001) "On Paramagnetism in Fluorinated Graphite: EPR and Solid-State NMR Study," *J. Phys. Chem. Solids* 62:959-964.

Pelikan et al. (2003) "On the Structural and Electronic Properties of Poly(dicarbon monofluoride): Solid-State Semi-Empirical INDO Study," *J. Solid State Chem.*, 174:233-240.

Petitjean et al. (1994) "Exothermic Exfoliation of Graphite-Intercalation Compounds Containing Perchloric-Acid," *Carbon* 32(3):461-467.

Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.

Piotrowski et al. (2001) "Self-Assembled Organometallic [12]Metallacrown-3 Complexes," *Chem. Eur. J.* 7(15):3197-3207.

Press et al. (1988) *Numerical Recipes in C, The Art of Scientific Computing*, Plenum Press, New York.

Rao et al. (1992) "Raman-Scattering and Transmission-Electron-Microscopy Studies of Fluorine-Intercalated Graphite Fibers CxF ($7.8 \geq x \geq 2.9$)," *Phys. Rev. B* 45:6883-6892.

Rinzler et al. (1998) "Large-Scale Purification of Single-Wall Carbon Nanotubes: Process, Product, and Characterization," *Appl. Phys. A* 67:29-37.

Rudorf et al. (1947) "Zur Konstitution des Kohlenstoff-Monofluorides," *Z. Anorg. Allg. Chem.* 253:281-296.

Ruff et al. (1934) "Die Reaktionsprodukte der verschiedenen Kohlenstoffformen mit Fluor II (Kohlenstoff-monofluoride)," *Z. Anorg. Allg. Chem.* 217:1-18.

Sano et al. (2002) "Properties of Carbon Onions Produced by an Arc Discharge in Water," *J. Appl. Phys.* 92(5):2783-2788.

Sato et al. (2004) "On the So-Called 'Semi-Ionic' C-F Bond Character in Fluorine-GIC," *Carbon* 42:3243-3249.

Sayama et al. (2002) "New Active Material Structure in Si Thin Film Electrode for Rechargeable Lithium Batteries," The 11th International Meeting on Lithium Batteries, Abstract 52, Monterey, CA, Jun. 23-28, 2002.

Seel et al. (2000) "Electrochemical Intercalation of $PF_6$ into Graphite," *J. Electrochem. Soc.* 147(3):892-898.

Shneyder "Two-Dimensional Oxidation of SiGe," 69-71, http://www.nnf.cornell.edu/1999REU/ra/Schneyder.pdf.

Shundrin et al. (2004) "The Electrochemical Oxidation of Polyfluorophenyltrifluoroborate Anions in Acetonitrile," *Z. Anorg. Allg. Chem.* 630:1253-1257.

Singh et al. (2006) "Study of Interactions of Various Ionic Species with Solvents Toward the Design of Receptors," *Theor. Chem. Acc.* 115:127-135.

Skowronski et al. (2004) "Electrochemical Intercalation of $ZnCl_2$-$CrO_3$-GIC (Graphite Intercalation Compound) with Sulfuric Acid," *Polish J. Chem.* 78:1339-1344.

Steed, J.W. (2001) "First- and Second Sphere Coordination Chemistry of Alkali Metal Crown Ether Complexes," *Coord. Chem. Rev.* 215:171-221.

Stein et al. (1987) "π-Electron Properties of Large Condensed Polyaromatic Hydrocarbons," *J. Am. Chem. Soc.* 109:3721-3729.

Su et al. (2000) "A Scalable CVD Method for the Synthesis of Single-Walled Carbon Nanotubes with High Catalyst Productivity," *Chem. Phys. Lett.* 322(5):321-326.

Sun et al. (2003) "The Compatibility of a Boron-Based Anion Receptor with the Carbon Anode in Lithium-Ion Batteries," *Electrochem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.

Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.

Takamura et al. (2002) "Li Insertion/Extraction Reaction of a Si Film Evaporated on Ni Foil," The 11th International Meeting on Lithium Batteries, Abstract 257, Monterey, CA, Jun. 23-28, 2002.

Takenobu et al. (2003) "Hydrogen Storage in $C_{70}$ Encapsulated Single-Walled Carbon Nanotube," *Synthetic Metals* 135-136:787-788.

Thess et al. (1996) "Crystalline Ropes of Metallic Carbon Nanotubes," *Science* 273:483-487.

Touhara et al. (1987) "On the Structure of Graphite Fluoride," *Anorg. All. Chem.*, 544:7-20.

Touhara et al. (2000) "Property Control of Carbon Materials by Fluorination," *Carbon* 38:241-267.

Touhara et al. (2002) "Property Control of New Forms of Carbon Materials by Fluorination," *J. Fluorine Chem.* 114:181-188.

Touhara et al. (1987) "Electrochemical Characteristics of Fluorine Intercalated Graphite Fiber-Lithium Cells," *Electrochemica Acta* 32(2):293-298.

Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.

Toyoda et al. (2004) "Exfoliation of Carbon Fibers," *J. Phys. Chem. Solids* 65:109-117.

Tuinstra et al. (1970) "Raman Spectrum of Graphite," *J. Chem. Phys.* 53(3):1126-1130.

Ue et al. (2002) "Anodic Stability of Several Anions Examined by AB Initio Molecular Orbital and Density Functional Theories," *J. Electrochem. Soc.* 149(12):A1572-A1577.

Ue et al. (2006) "Electrochemical Properties of $Li[C_nF_{2n+1}BF_3]$ as Electrolyte Salts for Lithium-Ion Cells," *Solid State Ionics* 177:323-331.

Watanabe et al. (1988) "Graphite Intercalation Compound of Fluorine," In; *Graphite Fluorides*, Elsevier, Amsterdam, Ch. 8, pp. 240-261.

Wantanabe et al. (1988) "Lithium-Graphite Fluoride Battery," In; *Graphite Fluorides*, Elsevier, Amsterdam, Ch. 5, pp. 148-203.

Wantanabe et al. (1988) "Preparation, Stoichiometry and Structure of Graphite Fluoride," In; *Graphite Fluorides*, Elsevier, Amsterdam, Ch. 2, pp. 23-89.

Watanabe, N. (1981) "Characteristics and Applications of Graphite Fluoride," *Physica B* 105:17-21.

Whitacre et al. (Sep. 2006) "Low Operational Temperature Li-CFx Batteries Using Cathodes Containing Sub'Fluorinated Graphite Materials," *J. Power Sources* 160:577-584.

Whittingham (1975) "Mechanism of Reduction of Fluorographite Cathode," *J. Electrochem. Soc.*, 122:526-527.

Wilkie et al. (1979) "The Solid-State $^{13}$C-NMR and $^{19}$F-NMR Spectra of Some Graphite Fluorides," *J. Solid State Chem.* 30:197-201.

Winter et al. (2004) "Carbonaceous and Graphitic Anodes," In; *Lithium Batteries Science and Technology*, Ch. 5, Kluer Academic Publisherss, pp. 144-194.

Woo et al. (2003) "Structural Characteristics of Carbon Nanorods and Nanotubes Grown Using Electron Cyclotron Resonance Chemical Vapor Deposition," *J. Appl. Phys.* 94(10):6789-6795.

Xu et al. (2004) "Nonaqueous Liquid Electrolytes for Lithium-Based Rechargeable Batteries," *Chem. Rev.* 104:4303-4417.

Yang et al. (2002) "Characteristics and Carbonization Behaviors of Coal Extracts," *Fuel Processing Technol.* 70:207-215.

Yazami et al. (2006) "The Kinetics of Sub-Fluorinated Carbon Fluoride Cathods for Lithium Batteries," Meeting Abstracts, Electrochem Soc., 210th ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Yoshida et al. (1991) "Exfoliated Graphite from Various Intercalation Compounds," *Carbon* 29(8):1227-1231.

Zajac et al. (2000) "The Structure and Properties of Graphite Monofluoride Using the Three-Dimensional Cyclic Cluster Approach," *J. Solid State Chem.*, 150:286-293.

Zhao et al. (2005) "A Calixarene-Amide-tetrathiafulvalene Assembly for the Electrochemical Detection of Anions," *New J. Chem.* 29:1164-1167.

Zheng et al. (2002) "CVD Synthesis and Purification of Single-Walled Carbon Nanotubes on Aerogel-Supported Catalyst," *Appl. Phys. A* 74:345-348.

Zhou et al. (2005) "Li[$C_2F_5BF_3$] as an Electrolyte Salt for 4 V Class Lithium-Ion Cells," *J. Electrochem. Soc.* 152(2):A351-A356.

Zhou et al. (1999) "Controlled Li Doping of Si Nanowires by Electrochemical Insertion Method," Applied Physics Letters, 75(16):2447-2449.

Author (Unknown), 2004, "Meeting the Energy Need of Future Warriors," *National Academic Press*, www.nap.edu/openbook/0309092612/html/91.html, Downloaded Oct. 14, 2005.

Author (Unknown), 2004, "Meeting the Energy Need of Future Warriors," National Academic Press, www.nap.edu/openbook/030909261/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatteryFAQ.html, Last Updated Aug. 17, 2003.

Giraudet et al. (2006) "Comparative Performances for Primary Lithium Battereis of Some Covalent and Semi-Covalnet Graphit Fluorides," *J. Power Sources* 158:1365-1372.

International Search Report and Written Opinion, Corresponding to International Application No. PCT/US07/62243, Mailed Mar. 27, 2008.

Lagow et al. (1974) "Some New Synthetic Approaches to Graphite Fluorine Chemistry," *J. Chem. Soc. Dalton Trans* :1268-1273.

Watanabe et al. (1974) "Vapor Phase Amination Reaction of Phenol Over Solid Acid Catalysts," *Nippon Kagaku Kaishi* 3:540-544.

Wood et al. (1973) "Thermodynamic, Electrochemical, and Synthetic Studies of the Graphite-Fluorine Compounds Fluoromethylidyne and Carbon Fluoride ($C_4F$)," *Chemical Abstracts* 78:366.

Yazami et al. (2007) "The Kinetics of Sub-Fluorinated Carbon Fluoride Cathodes for Lithium Batteries," *ECS Trans.* 3(36):199-211.

Bi et al. (1995) "Nanoscale Carbon Blacks Produced by $CO_2$ Laser Pyrolysis," *J. Mater. Res.* 10(11):2875-2884.

Matsuo et al., (1995), "Carbon-Fluorine Bondings of Fluorinated Fullerene and Graphite," *Zeitschrift für anorganische und allgemine Chemie*, 621:1943-1950.

Nanse et al. (1997) "Fluorination of Carbon Blacks, an X-Ray Photoelectron Spectroscopy Study. Part II XPS Study of a Furnace Carbon Black Treated with Gaseous Fluorine at Temperatures Below 100° C. Influence of the Reaction Parameters and of the Activation of the Carbon Black on the Fluorine Fixation," *Carbon* 35(3):371-388.

Supplementary European Search Report, Corresponding to European Application No. EP 07 75 7061, Completed Feb. 10, 2010.

Office Action Mailed Aug. 18, 2010 and Response Corresponding to U.S. Appl. No. 12/049,147, filed Mar. 14, 2008.

Office Action Mailed Sep. 17, 2010 Corresponding to U.S. Appl. No. 12/489,565, filed Jun. 23, 2009.

Office Action mailed Aug. 28, 2008 and Response Corresponding to U.S. Appl. No. 11/422,564, filed Jun. 6, 2006.

International Search Report and Written Opinion Corresponding to International Patent Application PCT/US08/57092, Mailed Jul. 22, 2008.

Examination Report Corresponding to European Patent Application 07757061.2, issued Aug. 16, 2010.

Office Action and English Translation Corresponding to Chinese Patent Application 200780005815.7 issued Jun. 13, 2010.

Office Action and English Translation Corresponding to Chinese Patent Application 200680042706.8 issued Apr. 26, 2010.

International Search Report, Corresponding to International Application No. PCT/US06/60991, Mailed Nov. 15, 2007.

International Search Report, Corresponding to International Application No. PCT/US06/20911, Mailed Aug. 22, 2007.

Office Action Corresponding to Chinese Patent Application No. 200780006081.4, Issued Aug. 28, 2009.

Office Actions and Responses Corresponding to U.S. Appl. No. 11/675,308, filed Feb. 15, 2007.

Office Actions and Responses Corresponding to U.S. Appl. No. 11/560,570, filed Nov. 16, 2006.

Office Actions and Responses Corresponding to U.S. Appl. No. 12/489,565, filed Jun. 23, 2009.

Written Opinion, Corresponding to International Application No. PCT/US05/37871, Mailed Apr. 19, 2006.

Written Opinion, Corresponding to International Application No. PCT/US07/62518, Mailed Sep. 27, 2007.

Written Opinion, Corresponding to International Application No. PCT/US06/60991, Mailed Nov. 15, 2007.

Written Opinion, Corresponding to International Application No. PCT/US06/20911, Mailed Aug. 22, 2007.

Office Action issued Mar. 6, 2012 and English Translation for Japanese Patent Application P2008-534512.

* cited by examiner

ELECTROCHEMISTRY OF CARBON SUBFLUORIDES

CROSS-REFERENCE TO RELATED APPLICATIONS

This application is a continuation in part of U.S. application Ser. No. 11/422,564, filed Jun. 6, 2006, which claims the benefit of U.S. Provisional Application 60/724,084, filed Oct. 5, 2005 and is a continuation in part of U.S. application Ser. No. 11/253,360 filed Oct. 18, 2005, which also claims the benefit of U.S. Provisional Application 60/724,084, filed Oct. 5, 2005. This application is also a continuation in part of U.S. application Ser. No. 11/675,308 and International Application PCT/US2007/62243, both filed Feb. 15, 2007, both of which claim the benefit of U.S. Provisional Application 60/774,262, filed Feb. 16, 2006, 60/784,957, filed Mar. 21, 2006 and 60/784,960, filed Mar. 20, 2006. This application also claims the benefit of U.S. Provisional Applications No. 60/775,110, filed Feb. 21, 2006, 60/775,559, filed Feb. 22, 2006, and the United States Provisional Application entitled "Coke Based Subfluorinated Carbon Fluorides ($CF_x$) Cathodes in Lithium Batteries", to Yazami et al. filed Feb. 9, 2007. Each of these applications is incorporated by reference in its entirety to the extent not inconsistent with the disclosure herein.

BACKGROUND OF INVENTION

This invention is in the field of fluorinated carbon materials, in particular subfluorinated graphite and coke particles.

Fluorinated carbons are used commercially as a positive electrode material in primary lithium batteries. Fluorination of graphite allows intercalation of fluorine between the carbon layers. Li/$CF_x$ battery systems are known to be capable of delivery of up to 700 Wh/kg, 1000 Wh/l, at room temperature, and at a rate of C/100 (i.e., a battery current of a $\frac{1}{100}^{th}$ that of the capacity of the battery per hour). (See, e.g., Bruce, G. Development of a CFx D Cell for Man Portable Applications. in Joint Service Power Expo. 2005; and Gabano, J. P., ed. Lithium Batteries, by M. Fukuda & T. Iijima. 1983, Academic Press: New York). Cathodes in these systems typically have carbon-fluoride stoichiometries typically ranging from $CF_{1.05}$ to $CF_{1.1}$. This cathode material, however, is known to be discharge rate limited, and currents lower than C/50 (battery current $\frac{1}{50}^{th}$ that of the capacity of the battery divided by 1 hour) are often necessary to avoid cell polarization and large capacity loss. High electronic resistivity up to $10^{15}$ Ohm·cm of $CF_x$ is a potential cause of the observed discharge rate limitations, as there is a strong correlation between cathode thickness and performance; thicker cathodes tend to be more rate-limited. (See, e.g., V. N. Mittkin, J. Structural Chemistry, 2003, Vol. 44, 82-115, translated from Zhurnal Structunoi Khimii, 2003, Vol. 44, 99-138).

Other industrial applications of fluorinated carbons include use as solid lubricants or as reservoirs for very active molecular oxidizers such as $BrF_3$ and $ClF_3$.

In a lithium/$CF_x$ cell, the cell overall discharge reaction, first postulated by Wittingham (1975) Electrochem. Soc. 122: 526, can be schematized by equation (1):

$$(CF_x)_n + xnLi \leftrightarrow nC + nxLiF \quad (1)$$

Thus, the theoretical specific discharge capacity $Q_{th}$, expressed in mAh·g$^{-1}$, is given by equation (2):

$$Q_{th}(x) = \frac{xF}{3.6(12+19x)} \quad (2)$$

where F is the Faraday constant and 3.6 is a unit conversion constant.

The theoretical capacity of $(CF_x)_n$ materials with different stoichiometry is therefore as follows:
x=0.25, $Q_{th}$=400 mAh·g$^{-1}$; x=0.33, $Q_{th}$=484 mAh·g$^{-1}$; x=0.50, $Q_{th}$=623 mAh·g$^{-1}$; x=0.66, $Q_{th}$=721 mAh·g$^{-1}$; and x=1.00, $Q_{th}$=865 mAh·g$^{-1}$.

The reactivity of carbon allotropic forms with fluorine gas differs largely owing either to the degree of graphitization or to the type of the carbon material (Hamwi A. et al.; J. Phys. Chem. Solids, 1996, 57(6-8), 677-688). In general, the higher the graphitization degree, the higher the reaction temperature. Carbon fluorides have been obtained by direct fluorination in the presence of fluorine or mixtures of fluorine and an inert gas. When graphite is used as the starting material, no significant fluorination is observed below 300° C. From 350 to 640° C., two graphite fluorides, mainly differing in crystal structure and composition are formed: poly(dicarbon monofluoride) $(C_2F)_n$ and poly(carbon monofluoride) $(CF)_n$ (Nakajima T.; Watanabe N. Graphite fluorides and Carbon-Fluorine compounds, 1991, CRC Press, Boston; Kita Y.; Watanabe N.; Fujii Y.; J. Am. Chem. Soc., 1979, 101, 3832). In both compounds the carbon atoms take the sp$^3$ hybridization with associated distortion of the carbon hexagons from planar to 'chair-like' or 'boat-like' configuration. Poly(dicarbon monofluoride) is obtained at ~350° C. and has a characteristic structure, where two adjacent fluorine layers are separated by two carbon layers bonded by strongly covalent C—C bonding along the c-axis of the hexagonal lattice (stage 2). On the other hand, poly(carbon monofluoride) which is achieved at ~600° C. has a structure with only one carbon layer between two adjacent fluorine layers (stage 1). Graphite fluorides obtained between 350 and 600° C. have an intermediary composition between $(C_2F)_n$ and $(CF)_n$ and consist of a mixture of these two phases (Kita, 1979, ibid.). The stage s denotes the number of layers of carbon separating two successive layers of fluorine. Thus a compound of stage 1 has a sequence of stacking of the layers as FCF/FCF . . . , and a compound of stage 2 has the sequence FCCF/FCCF . . . . Both poly(dicarbon monofluoride) and poly(carbon monofluoride) are known to have relatively poor electrical conductivity.

U.S. Pat. No. 3,536,532 to Watanabe et al. describes a primary cell including a positive electrode having as the principal active material a crystalline fluorinated carbon represented by the formula $(CF_x)_n$. where x is not smaller than 0.5 but not larger than 1. As described, the carbon is fluorinated by heating the reactor to the desired temperature then introducing fluorine. U.S. Pat. No. 3,700,502 to Watanabe et al. describes a battery including a positive electrode having as its active material an amorphous or partially amorphous solid fluoridated carbon represented by the Formula $(CF_x)_n$, wherein x is in the range of from greater than 0 to 1. U.S. Pat. No. 4,247,608 to Watanabe et al. describes an electrolytic cell including a positive electrode having as the main active material a poly-dicarbon monofluoride represented by the formula $(C_2F)_n$ wherein n is an integer.

Lam and Yazami (Lam, P. et al., 2006, J. Power Sources, 153, 354-359) present results for sub-fluorinated graphite fluorides $(CF_x)_n$ where 0.33<x<0.63.

Carbon-fluorine intercalation compounds have been also obtained by incorporating other compounds capable of acting as a fluorination catalyst, such as HF or other fluorides, into the gas mixture. These methods can allow fluorination at lower temperatures. These methods have also allowed intercalation compounds other than $(C_2F)_n$ and $(CF)_n$ to be prepared (N. Watanabe et al., "Graphite Fluorides", Elsevier, Amsterdam, 1988, pp 240-246). These intercalation compounds prepared in the presence of HF or of a metal fluoride have an ionic character when the fluorine content is very low (F/C<0.1), or an iono-covalent character for higher fluorine contents (0.2<F/C<0.5). In any case, the bonding energy measured by Electron Spectroscopy for Chemical Analysis (ESCA) gives a value less than 687 eV for the most important peak of the $F_{1s}$ line and a value less than 285 eV for that of the $C_{1s}$ line (T. Nakajima, Fluorine-carbon and Fluoride-carbon, Chemistry, Physics and Applications, Marcel Dekker 1995 p. 13).

SUMMARY OF THE INVENTION

The invention provides subfluorinated graphite and coke materials which can provide enhanced cathode performance at high discharge rates compared to conventional $CF_1$ positive electrode active materials. These fluorinated materials are suitable for use in electrochemical devices such as primary batteries and secondary batteries. In particular, use of subfluorinated graphite and coke in lithium batteries can provide good battery performance at high discharge rates.

The subfluorinated carbonaceous materials of the invention are multicomponent materials having a fluorinated carbonaceous component and an unfluorinated carbonaceous component and/or a "lightly fluorinated" carbonaceous component in which fluorine is not strongly bound to carbon. The presence of an unfluorinated and/or a "lightly fluorinated" carbonaceous component can provide higher electrical conductivity than would be obtained for a material consisting solely of the fluorinated phases poly(dicarbon monofluoride), poly(carbon monofluoride) and combinations thereof.

In an embodiment, the subfluorinated graphite materials produced by the methods of the invention retain a greater amount of unfluorinated carbon, "lightly fluorinated" carbon, or a combinations thereof than materials of the same average F/C ratio produced with other types of fluorination processes known to the art. In an embodiment, the methods of the invention allow production of subfluorinated graphite materials having a fluorine to carbon ratio greater than 0.63 and less than or equal to 0.95.

In an embodiment, the invention provides a method for making a subfluorinated carbonaceous material, the method comprising the steps of:
 a. providing a carbonaceous material selected from graphite particles or coke particles;
 b. exposing the carbonaceous material to a flowing gaseous source of elemental fluorine;
 c. heating the carbonacous material to a selected reaction temperature, the selected temperature being between 330° C. and 600° C. for graphite particles and 300° C. and 500° C. for coke particles;
 d. maintaining the carbonaceous material at the selected temperature for sufficient time to obtain a subfluorinated carbonaceous material.

The methods of the invention are capable of producing subfluorinated graphite materials having the average chemical composition $CF_x$ wherein $0.33 \leq x \leq 0.95$ and subfluorinated coke materials having the average chemical composition $CF_x$ wherein $0.18 \leq x \leq 0.95$. In different embodiments, the subfluorinated material has an average chemical composition CFx in which $0.63 < x \leq 0.95$, $0.66 \leq x \leq 0.95$, $0.7 \leq x \leq 0.95$; or $0.7 \leq x \leq 0.9$. In different embodiments, the amount of unfluorinated and "lightly fluorinated" carbon in the subfluorinated material is between 5% and 40%, between 5% and 37%, between 5% and 25%, between 10% and 20%, or about 15%.

In another embodiment, the invention provides a subfluorinated carbonaceous material made by the process of:
 a. providing a carbonaceous material selected from graphite particles and coke particles;
 b. exposing the carbonaceous material to a flowing gaseous source of elemental fluorine;
 c. heating the carbonaceous material to a selected reaction temperature, the selected temperature being between 330° C. and 600° C. for graphite particles and 300° C. and 500° C. for coke particles; and
 d. maintaining the carbon material at the selected temperature for sufficient time to obtain a subfluorinated carbonaceous material having an average chemical composition CFx where $0.63 < x \leq 0.95$.

The invention also provides subfluorinated graphite materials having an average chemical composition $CF_x$ in which $0.63 < x \leq 0.95$, wherein $^{13}C$ nuclear magnetic resonance spectroscopy analysis of the subfluorinated graphite provides a spectrum comprising at least one chemical shift peak centered between approximately 100 and 150 ppm relative to TetraMethylSilane (TMS) and another chemical shift peak centered at approximately 84-88 ppm relative to TMS.

Furthermore, the invention also provides a subfluorinated coke material prepared by direct fluorination of coke having a coherence length $L_c$ between 5 nm and 20 nm, the subfluorinated coke material having an average chemical composition $CF_x$ in which $0.63 < x \leq 0.95$. $^{13}C$ nuclear magnetic resonance spectroscopy analysis of the subfluorinated coke provides a spectrum comprising at least one chemical shift peak centered between approximately 100 and 150 ppm relative to TetraMethylSilane (TMS) and another chemical shift peak centered at approximately 84-88 ppm relative to TMS.

DETAILED DESCRIPTION OF THE INVENTION

Figure 1:
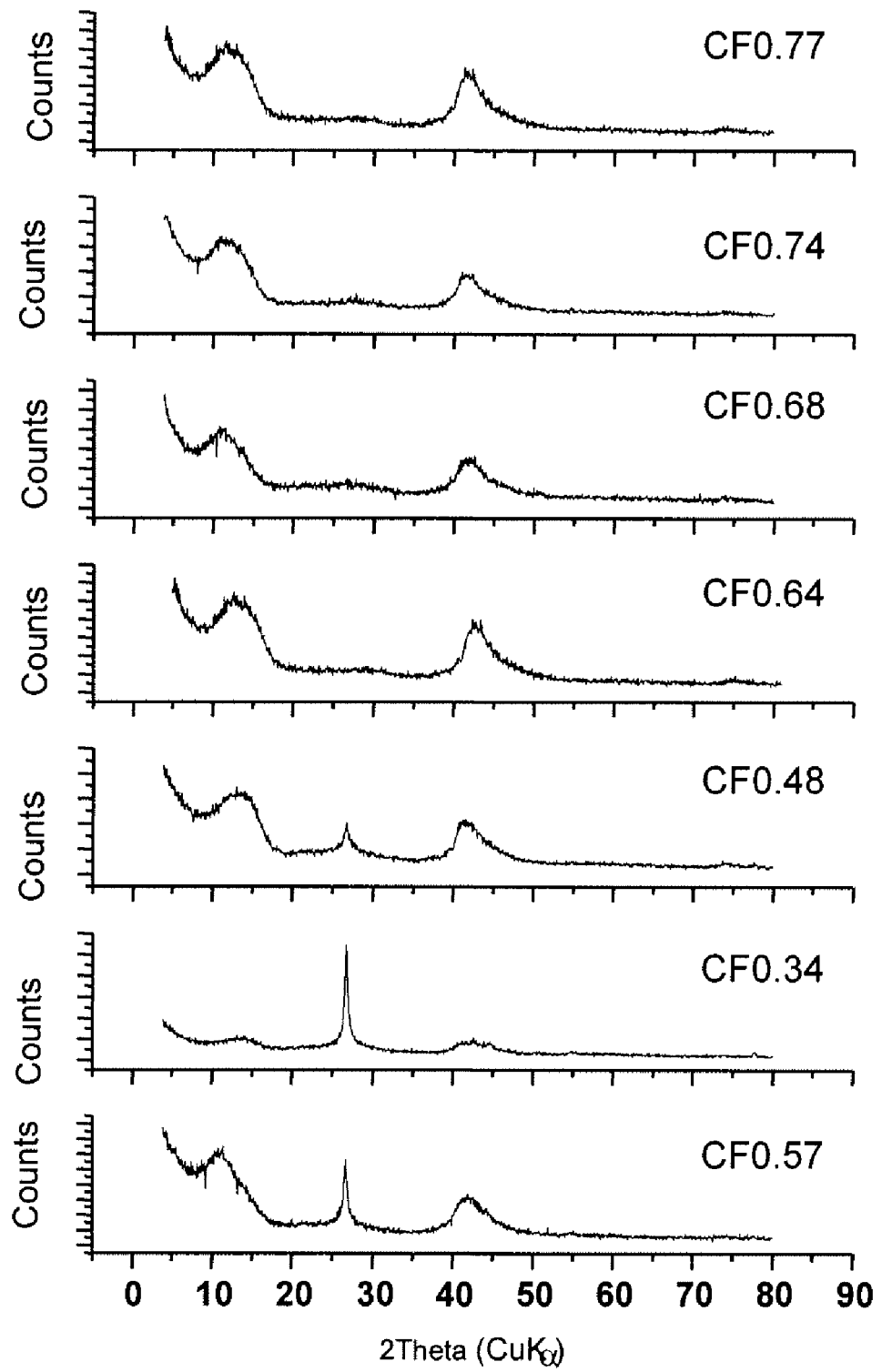
FIG. 1 shows X-ray diffraction spectra for subfluorinated graphite materials with a range of F/C ratios.

In an embodiment, the invention provides subfluorinated carbonaceous materials obtained through direct fluorination of graphite or coke particles. Subfluorinated carbonaceous materials obtained through fluorination of graphite particles may also be referred to as subfluorinated graphites or subfluorinated graphite materials herein. Similarly, subfluorinated carbonaceous materials obtained through fluorination of coke particles may also be referred to as subfluorinated cokes or subfluorinated coke materials herein.

Coke is a carbonaceous material which is typically formed from petroleum or coal pitch. As is known in the art, the structure of coke materials depends on the heat treatment temperature of the material. In the temperature range above about 2100° C., coke converts to crystalline graphite. At lower temperatures, between about 1500° C. and about 2100° C., the carbon layers are disordered, with turbostratic stacking defects. At even lower temperatures, between about 700° C. and 1500° C., the structure can be described as having bent columns. The structure may be characterized by the coherence length $L_c$, which relates to the crystallite dimension in the c-direction and can be determined from X-ray diffraction analysis. The parameter $L_a$, which relates to the crystallite dimension in the a-direction, can be determined by Raman spectroscopy. Determination of these parameters is known to those skilled in the art. In an embodiment, coke suitable for use with the present invention has a coherence length $L_c$ along the c-axis perpendicular to the carbon layers greater than about 5 nm and less than about 20 nm.

As used herein, the expression "subfluorinated carbonaceous material" refers to a multicomponent carbonaceous material having a fluorinated carbonaceous component in which at least some of the carbon is strongly bound to fluorine and an unfluorinated carbonaceous component and/or a "lightly fluorinated" carbonaceous component in which fluorine is not strongly bound to carbon. Multiphase subfluorinated carbonaceous materials may comprise a mixture of carbonaceous phases including, an unfluorinated carbonaceous phase (e.g., graphite or coke), a "lightly fluorinated" phase and one or more fluorinated phases (e.g., poly(carbon monofluoride ($CF_1$); poly(dicarbon monofluoride) etc.). Subfluorinated carbonaceous materials include carbonaceous materials exposed to a fluorine source under conditions resulting in incomplete or partial fluorination of a carbonaceous starting material. Partially fluorinated carbon materials include materials in which primarily the exterior portion has reacted with fluorine while the interior region remains largely unreacted.

As used herein, fluorination of a material involves introduction of fluorine into the material. In the present invention, fluorination will typically involve formation of bonds between carbon and fluorine. As is known in the art, fluorine is capable of forming both ionic and covalent bonds with carbon. In some cases, C—F bonds have also been classified as intermediate in strength between ionic and covalent bonds (e.g. partially ionic, semi-ionic, semi-covalent). The fluorination method can influence the type of bonding present in the fluorination product.

In the present invention, the fluorinated carbon materials are produced by direct fluorination. In direct fluorination, at least some of the C—F bonds formed tend to be of higher energy and have a stronger, more covalent character than the C—F bonds obtained through low temperature fluorine intercalation. Fluorine-graphite intercalation compounds are expected to have carbon-fluorine bonding varying between the ionic and the semi-covalent depending on the fluorine content (Matsuo, Y. et al, 1995 Z. Anorg. Allg. Chemie, 621, 1943-1950). For example, Matsuo et al. (1995) classify XPS $F_{1s}$ spectral peaks at 687 eV, 685 eV and 683 eV, respectively, as semi-covalent, nearly ionic, and ionic. In contrast, the $F_{1s}$ peak in covalently bonded graphite fluoride is at 689.3-689.6 eV (Watanabe 1988 ibid.).

In one aspect of the invention, at least some of the carbon in the fluorination product is strongly bound to fluorine (covalently bound or nearly covalently bound to fluorine).

As used herein, a carbon-fluorine bond in the fluorination product is classified as nearly covalent if the bond has an energy greater than the energy of "semi-ionic" or "semi-covalent" carbon-fluorine bonds in graphite intercalation compounds of fluorine obtained through low temperature fluorination of graphite, but less than the typical energy of covalent carbon-fluorine bonds in poly(dicarbon monofluoride) $(C_2F)_n$ or poly(carbon monofluoride) $(CF)_n$.

In another aspect of the invention, the subfluorinated carbonaceous material comprises a "lightly fluorinated" carbonaceous component in which fluorine is not strongly bound to carbon. The F—C bond energy in such a carbonaceous component is less than that of a covalent or nearly covalent F—C bond.

The nature of the C—F bonding in the fluorination product may be determined by suitable analysis techniques. Such techniques are known to those of ordinary skill in the art, and include, but are not limited to, Fourier Transform Infrared Spectroscopy (FT-IR), Nuclear Magnetic Resonance Spectroscopy (NMR), X-Ray Photoelectron Spectroscopy (XPS) or Electron Spectroscopy for Chemical Analysis (ESCA). The extent of covalency in the C—F bonds can be assessed by comparison of the analysis results for the fluorination product to those obtained for a "standard" commonly accepted to have covalent C—F bonds. A match (within experimental error) between the analysis results for the fluorination product and those of the "standard" may be taken to indicate covalent bonding. The graphite fluorides poly(dicarbon monofluoride) $(C_2F)_n$ and poly(carbon monofluoride) $(CF)_n$ are commonly accepted to have covalent C—F bonds.

As is known to the art, solid state $^{19}F$-NMR spectra having a chemical shift peak centered at about −190 ppm/$CFCl_3$ indicate fluorine atoms covalently bonded to carbon atoms. As another example, solid state $^{13}C$-NMR spectra having a resonance present at a chemical shift of 84-88 ppm/TMS indicate carbon atoms covalently bound to fluorine atoms (Giraudet J.; Dubois M.; Guérin K.; Hamwi A.; Masin F.; *J. Phys. Chem. Solids* 2006, 67(5-6), 1100). Fourier Transform Infrared Spectroscopy (FT-IR) spectra showing vibration bands centered at about 1215 $cm^{-1}$ are also indicative of covalent C—F bonds. In an embodiment, $^{13}C$-NMR analysis of the subfluorinated materials of the invention gives a spectrum which comprises a chemical shift peak centered at approximately 84-88 ppm relative to TMS, indicating carbon atoms strongly bound to fluorine atoms.

As is known to the art, solid state $^{13}C$-NMR spectra having a resonance present at a chemical shift of about 42 ppm/TMS indicate carbon atoms covalently bound to carbon atoms (sp$^3$ hybridization) (Giraudet, 2006, ibid.). In an embodiment, $^{13}C$-NMR analysis of the subfluorinated graphite materials of the invention gives a spectrum which comprises a chemical shift peak centered at approximately 42 ppm relative to TMS, indicating carbon atoms strongly bound to other carbon atoms.

Solid state $^{13}$C-NMR spectra of fluorinated graphite material having a resonance present at a chemical shift of about 136 ppm/TMS has been interpreted as indicating "graphitic" sp$^2$-type carbon atoms which are either non-fluorinated or in a low interaction with fluorine (Giraudet, 2006 ibid.). In addition, solid state $^{13}$C-NMR spectra of graphite material can display a resonance present at a chemical shift of about 119 ppm/TMS (Giraudet, 2006 ibid.). In an embodiment, $^{13}$C nuclear magnetic resonance spectroscopy analysis of the subfluorinated carbonaceous materials of the invention provides a spectrum comprising at least one chemical shift peak centered between approximately 120 and 140 ppm relative to TMS, indicating "graphitic" carbon either not bonded or only weakly bonded to fluorine. In one embodiment, an XRD spectrum of the subfluorinated graphite or coke comprises a substantial peak at 2θ approximately in the range 25.5-26.4 degrees, using Cu K$_\alpha$ radiation, corresponding to the graphite or coke (002) peaks. In another embodiment, an XRD spectrum of the subfluorinated graphite does not comprise a substantial peak at 2θ approximately in the range 26.3-26.4 degrees, using Cu K$_\alpha$ radiation.

The relative amount of graphitic carbon atoms (nonfluorinated and "lightly fluorinated" carbon) can be estimated through comparison of the areas of chemical shift peaks in a $^{13}$C-NMR spectra. In particular, the sum of the area of the peaks corresponding to nonfluorinated and "lightly" fluorinated carbon is divided by the sum of these peaks with the peak corresponding to carbon in strong interaction with fluorine and (if present) the peak corresponding to a strong carbon-carbon interaction. Additional peaks may be included in the denominator, as explained in Example 5, which relates to subfluorinated coke materials. If any peak is not clearly seen in the spectrum, it not included in the sum.

The average ratio of fluorine to carbon (F/C) may be used as a measure of the extent of fluorination. This average ratio may be determined through weight uptake measurements or through quantitative NMR measurements. When fluorine is not uniformly distributed through the wall thickness of the carbon material, this average ratio may differ from surface fluorine to carbon ratios as may be obtained through x-ray photoelectron spectroscopy (XPS) or ESCA.

Without wishing to be bound by any particular belief, fluorination of graphite and heat treated coke at relatively low temperatures is believed to result primarily in fluorination of the surface of the carbon material. The remainder of the carbon material remains unfluorinated. This surface fluorination may include formation of groups such as $CF_2$, and $CF_3$.

At higher temperatures, fluorination is believed to proceed past the surface of the material. In an embodiment, the fluorinated graphite product has some crystallographic similarities to a mixture of graphite fluorides $(C_2F)_n$ and $(CF)_n$. The average interlayer spacing may be intermediate between that of graphite poly(dicarbon monofluoride) and that of graphite poly(carbon monofluoride). In another embodiment, the fluorinated coke product has some crystallographic similarities to $(CF)_n$.

In an embodiment, the subfluorinated carbonaceous material comprises a plurality of nanostructured particles; wherein each of the nanostructured particles comprise a plurality of fluorinated domains and a plurality of unfluorinated or "lightly" fluorinated domains. In the context of this description a "domain" is a structural component of a material having a characteristic composition (e.g., unfluorinated or fluorinated), phase (e.g., amorphous, crystalline, $C_2F$, $CF_1$, graphite, coke.), and/or morphology. Useful subfluorinated carbonaceous materials for positive electrode active materials comprise a plurality of different domains. Individual fluorinated, "lightly fluorinated" and unfluorinated domains preferably for some applications have at least one physical dimension (e.g., lengths, depths, cross sectional dimensions etc.) less than about 50 nanometers, and more preferably for some applications at least one physical dimension less than about 10 nanometers. Positive electrode active materials particularly useful for electrochemical cells providing high performance at low temperatures include nanostructured particles having fluorinated domains and unfluorinated or "lightly" fluorinated domains that are distributed throughout each nanostructured particle of the active material, and in some embodiments substantially uniformly distributed throughout each nanostructured particle of the active material. In some embodiments, fluorinated domains of particles of the positive electrode active material comprise a subfluorinated carbonaceous material having an average stoichiometry CFy, wherein y is the average atomic ratio of fluorine atoms to carbon atoms and is selected from the range of about 0.8 to about 1.0, and the unfluorinated domains of the particles of the positive electrode active material comprise a unfluorinated carbonaceous phase, such as graphite or coke.

The term "nanostructured" refers materials and/or structures have a plurality of discrete structural domains with at least one physical dimension (e.g., height, width, length, cross sectional dimension) that is less than about 1 micron. In this context, structural domains refer to features, components or portions of a material or structure having a characteristic composition, morphology and/or phase. Nanostructured materials useful as positive electrode active materials, particularly under high discharge rates and/or at low temperatures, include nanostructured composite particles having a plurality of fluorinated carbon domains and unfluorinated or "lightly fluorinated" carbon domains. In some embodiments, nanostructured materials of the present invention comprise a plurality of structural domains having different compositions, morphologies and/or phase intermixed on a very fine scale (e.g., at least smaller than 10's of nanometers).

Use of nanostructured subfluorinated carbonaceous particles as positive electrode active materials provides a number of benefits in electrochemical cells of the present invention. First, nanoscale intermixing of fluorinated and unfluorinated or "lightly" fluorinated domains in these particles results in high interfacial surface areas between the fluorinated and unfluorinated domains. This attribute provides good electronic and interface properties between these domains facilitating electron transfer, particularly at low temperatures. In addition, the presence of an appreciable unfluorinated or "lightly" fluorinated component in these particles enhances net electrode conductivity by providing nanoscale electrically conducting pathways in the electrode active material. Further, the distribution of nanoscale fluorinated domains in these materials provides an appreciable density of fluorinated domains having high fluorine ion loading exposed to the electrolyte, thereby resulting in a high interfacial surface area of fluorinated structural domains exposed to the electrolyte further enhancing the kinetics at the positive electrode.

Subfluorinated carbonaceous particles comprising positive electrode active materials in the present invention may have a wide range of physical dimensions, for example cross sectional dimensions ranging from about 100 nanometers to about 200 microns and lateral dimensions range from about 100 nanometers to about 500 microns. Optionally, carbonaceous particles useful in positive electrodes of the present electrochemical cells are porous. Optionally, carbonaceous particles useful in positive electrodes of the present electrochemical cells have large aspect ratios (Aspect ratio=(longitudinal physical dimensions (e.g., length)/(cross sectional physical dimension (e.g., diameter)), for example aspect ratios selected from the range of about 50 to about 1000. In some embodiments, carbonaceous particles useful in positive electrodes of the present electrochemical cells have a flake shapes and/or have a morphologies similar to unfluorinated graphite particles.

The fluorinated carbonaceous materials of the invention are prepared using a direct fluorination method, in which the graphite or coke particles are contacted with a gaseous source of elemental fluorine. The fluorination conditions (including mass of carbonaceous material, reaction temperature, reaction time, and fluorine flow rate) are selected to obtain the desired degree of fluorination of the carbon materials.

In an embodiment, the graphite or coke powder is uniformly spread on a nickel boat and introduced into a reactor. The reactor may be made of nickel, and have a horizontal setting. The reactor may be vacuum degassed prior to starting flow of fluorine gas. The reaction proceeds under fluorine dynamic flow (open reactor). (It is believed that if the reactor is closed (static reactor), the fluorination reaction becomes much slower.). The reactor is then heated. The reaction time is counted after the reactor reached the target temperature until the reactor heating is stopped. After the reactor cools down to the ambient temperature, excess (unreacted) fluorine may be evacuated under nitrogen flow until no trace of free fluorine is in the reactor.

In an embodiment, the reactor is heated at the rate between 0.5 degrees Celsius/minute and 5 degrees Celsius/minute. In an embodiment, the reactor is heated at the rate of 1 degrees Celsius/minute.

In different embodiments, the fluorination temperature for graphite particles may be between 330° C. and 600° C., between 375° C. and 550° C., or between 390° C. and 490° C. Weight loss due to volatile carbon-fluorine compounds is expected to occur at about 550° C.

In different embodiments, the fluorination temperature for coke particles may be between 300° C. and 550° C., between 350° C. and 450° C., or between 370° C. and 425° C. Weight loss due to volatile carbon-fluorine compounds is expected to occur at about 450° C.

In different embodiments, the time period is greater than 2 hours, between 2 and 40 hours, between 3 and 30 hours, between 4 and 20 hours, between 4 and 16 hours, between 4 and 12 hours, between 8 and 20 hours, between 8 and 16 hours, between 8 and 12 hours, or about 16 hours.

In an embodiment, the fluorination is conducted at atmospheric pressure with a gas mixture essentially consisting of $F_2$ and inert gas. The percentage of fluorine in the mixture may be between 5% and 100%, between 10% and 90%, between 20% and 80%, between 20% and 60%, between 20% and 50% or about 20%.

In an embodiment suitable for masses of coke up to about 5 g and masses of graphite up to about 40 g, the fluorine flow rate is between 0.5 and 2.0 g/fluorine per hour.

In different embodiments, the average particle size of the carbonaceous material is 2-200 microns, 5-50 microns, or 5-20 microns.

In other embodiments, the fluorination may be conducted at a pressure less than atmospheric pressure. In an embodiment, the fluorination may be conducted at pressures between 1 atm and 0.1 atm, or between 1 atm and 0.25 atm.

A suitable gaseous source of elemental fluorine will be known to one of ordinary skill in the art; an exemplary such source is a mixture $F_2$ and a sufficiently inert gas. Suitable inert gases include, but are not limited to nitrogen, and argon. Preferably, only trace amounts of HF or other fluorides known to be fluorine intercalation catalysts are present in the gas mixture.

The subfluorinated carbonaceous material of the invention can be heat treated following fluorination.

The term "electrochemical cell" refers to devices and/or device components that convert chemical energy into electrical energy or electrical energy into chemical energy. Electrochemical cells typically have two or more electrodes (e.g., positive and negative electrodes) wherein electrode reactions occurring at the electrode surfaces result in charge transfer processes. Electrochemical cells include, but are not limited to, primary batteries, secondary batteries, lithium batteries and lithium ion batteries. General cell and/or battery construction is known in the art, see e.g., U.S. Pat. Nos. 6,489,055, 4,052,539, 6,306,540, Seel and Dahn J. Electrochem. Soc. 147(3) 892-898 (2000).

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight. Specific capacity is typically expressed in units of ampere-hours $kg^{-1}$. The theoretical specific capacity is referred to as $Q_{th}$.

The term "discharge rate" refers to the current at which an electrochemical cell is discharged. Discharge current can be expressed in units of amperes. Alternatively, discharge current can be expressed "C/n" rate, where n is the number of hours theoretically needed to fully discharge the cell. For example, under C/5 rate and 3 C rate, the full discharge is expected to be reached in 5 hours and 20 minutes, respectively. Under a constant discharge current of intensity $I_x$, the theoretical discharge time $t_d$ is given by $Q_{th}(x)=I_x t_d$. $I_x$ is the discharge current intensity in units of current per unit weight (e.g. mA/g).

"Current density" refers to the current flowing per unit electrode area.

"Active material" refers to the material in an electrode that takes part in electrochemical reactions which store and/or deliver energy in an electrochemical cell. The present invention provides electrochemical cells having a positive electrode with a subfluorinated carbonaceous active material.

"Room temperature" refers to a temperature selected over the range of about 293 to 303 degrees Kelvin.

In the electrochemical devices of the invention, the subfluorinated carbonaceous materials are normally present in a composition that also includes a conductive diluent such as may be selected from, for example, acetylene black, carbon black, powdered graphite, cokes, carbon fibers, carbon nanotubes and metallic powders such as powdered nickel, aluminum, titanium, and stainless steel. The conductive diluent improves conductivity of the composition and is typically present in an amount representing about 1 wt. % to about 10 wt. % of the composition, preferably about 3 wt. % to about 8 wt. % of the composition. The composition containing the subfluorinated carbonaceous materials and the conductive diluent also, typically, contains a polymeric binder, with preferred polymeric binders being at least partially fluorinated. Exemplary binders thus include, without limitation, poly(ethylene oxide) (PEO), poly(vinylidene fluoride) (PVDF), a poly(acrylonitrile) (PAN), poly(tetrafluoroethylene) (PTFE), and poly(ethylene-co-tetrafluoroethylene) (PETFE). The binders, if present, represent about 5 wt. % to about 15 wt. % of the composition, while the subfluorinated carbonaceous material represent about 70 wt. % to about 90 wt. % of the composition, preferably about 75 wt. % to 85 wt. % of the composition.

The resulting subfluorinated carbonaceous material is then admixed with a conductive diluent and binder as described above, with the preferred weight ratios being about 70 wt/% to about 90 wt. %, more preferably about 75 wt. % to about 85 wt. % of subfluorinated carbonaceous material; about 1 wt. % to about 10 wt. %, preferably about 3 wt. % to about 8 wt. %, conductive diluent; and about 5 wt. % to about 15 wt. % binder.

Typically, the slurry formed upon admixture of the foregoing components is then deposited or otherwise provided on a conductive substrate to form the electrode. A particularly preferred conductive substrate is aluminum, although a number of other conductive substrates can also be used, e.g., stainless steel, titanium, platinum, gold, and the like. If the subfluorinated particles are elongated, they may be at least partially aligned during the deposition process. For example, shear alignment may be used to align the subfluorinated particles.

In still a further aspect of the invention, a method is provided for preparing an electrode for use in an electrochemical device, comprising the following steps:

preparing a subfluorinated carbonaceous material according to the methods of the invention;

mixing the subfluorinated material with a conductive diluent and a binder to form a slurry; and applying the slurry to a conductive substrate.

In an embodiment, the invention provides an electrochemical device comprising a first electrode and a second electrode, and an ion transporting material disposed therebetween, wherein the first electrode comprises a subfluorinated carbonaceous material according to the present invention.

In a primary lithium battery, for example, the aforementioned electrode serves as the cathode, with the anode providing a source of lithium ions, wherein the ion-transporting material is typically a microporous or nonwoven material saturated with a nonaqueous electrolyte. The anode may comprise, for example, a foil or film of lithium or of a metallic alloy of lithium (LiAl, for example), or of carbon-lithium, with a foil of lithium metal preferred. The ion-transporting material comprises a conventional "separator" material having low electrical resistance and exhibiting high strength, good chemical and physical stability, and overall uniform properties. Preferred separators herein, as noted above, are microporous and nonwoven materials, e.g., nonwoven polyolefins such as nonwoven polyethylene and/or nonwoven polypropylene, and microporous polyolefin films such as microporous polyethylene. An exemplary microporous polyethylene material is that obtained under the name Celgard® (e.g., Celgard® 2400, 2500, and 2502) from Hoechst Celanese. The electrolyte is necessarily nonaqueous, as lithium is reactive in aqueous media. Suitable nonaqueous electrolytes are composed of lithium salts dissolved in an aprotic organic solvent such as propylene carbonate (PC), ethylene carbonate (EC), ethyl methyl carbonate (EMC), dimethyl ether (DME), and mixtures thereof. Mixtures of PC and DME are common, typically in a weight ratio of about 1:3 to about 2:1. Suitable lithium salts for this purpose include, without limitation, $LiBF_4$, $LiPF_6$, $LiCF_3SO_3$, $LiClO_4$, $LiAlCl_4$, and the like. It will be appreciated that, in use, a change in voltage causes generation of lithium ions at the anode and migration of the ions through the electrolyte-soaked separator to the subfluorinated carbonaceous material of the cathode, "discharging" the battery.

In an embodiment, the invention provides an electrochemical device wherein the device is a primary lithium battery in which the first electrode acts at the cathode, the second electrode acts at the anode and comprises a source of lithium ions, and the ion-transporting material physically separates the first and the second electrode and prevents direct electrical contact therebetween.

In another embodiment, the subfluorinated carbonaceous material is utilized in a secondary battery, i.e., a rechargeable battery such as a rechargeable lithium battery. In such a case, the cations, e.g., lithium ions, are transported through a solid or a gelled polymer electrolyte—which also serves as a physical separator—to the subfluorinated electrode, where they are intercalated and de-intercalated by the subfluorinated material. Examples of solid polymer electrolytes include chemically inert polyethers, e.g., poly(ethylene oxide) (PEO), poly(propylene oxide) (PPO), and other polyethers, wherein the polymeric material is impregnated or otherwise associated with a salt, e.g., a lithium salt such as those set forth in the preceding paragraph. Examples of gelled polymer electrolytes include polyvinylene difluoride (PVDF) homo- or co-polymer impregnated or otherwise associated with a non-aqueous electrolyte such as those set forth in the preceding paragraph.

In another embodiment, the invention provides an electrochemical device, wherein the device is a secondary battery in which the second electrode comprises a source of ions of a metal selected from Groups 1, 2, and 3 of the Periodic Table of Elements and the ion-transporting material comprises a solid polymer electrolyte that permits transport of said metal cations and physically separates the first and second electrodes.

In still a further aspect of the invention, a rechargeable battery is provided that includes:

a first electrode comprising a subfluorinated carbonaceous material, the electrode capable of receiving and releasing cations of a metal selected from Groups 1, 2, and 3 of the Periodic Table of the Elements;

a second electrode comprising a source of the metal cations; and a solid or a gelled polymer electrolyte that permits transport of the metal cations and physically separates the first and second electrodes.

Figure 18:
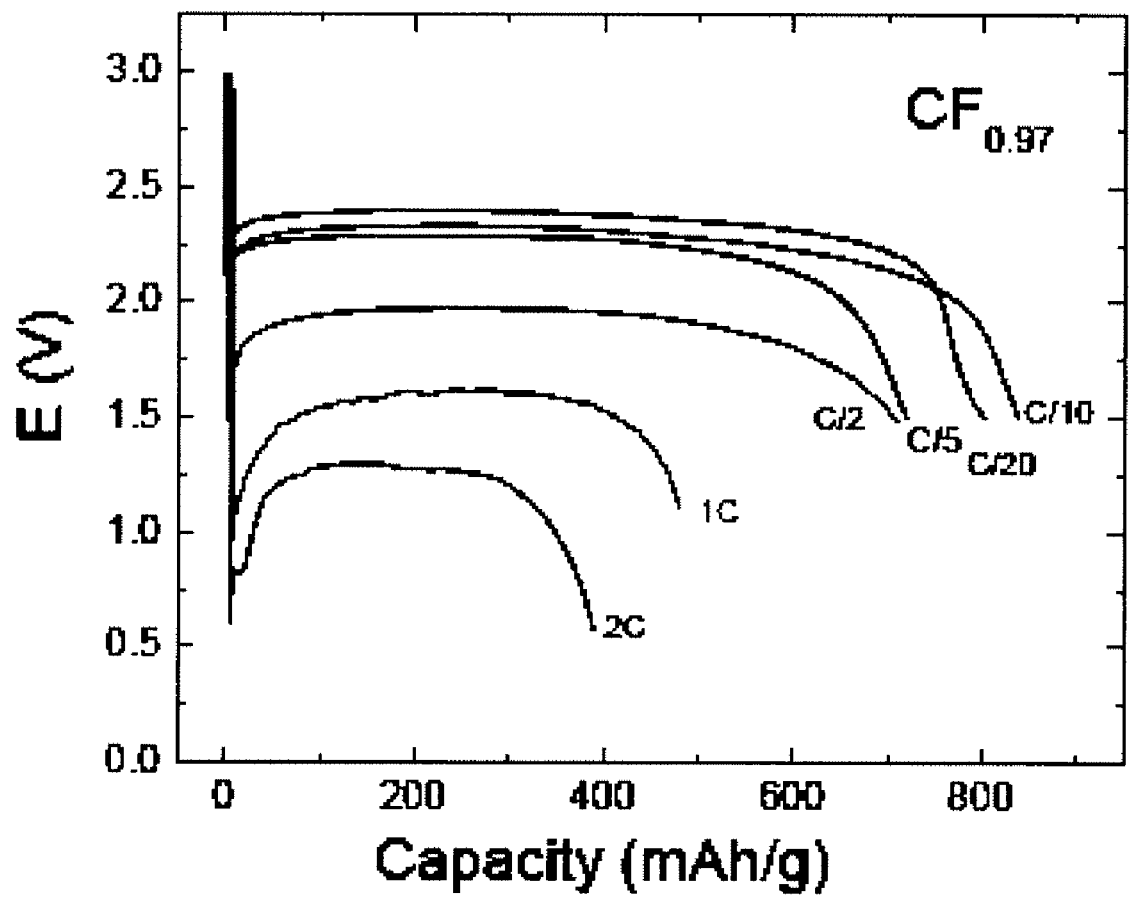
FIG. 18: Discharge curves for subfluorinated coke material $CF_{0.97}$.
Figure 19:
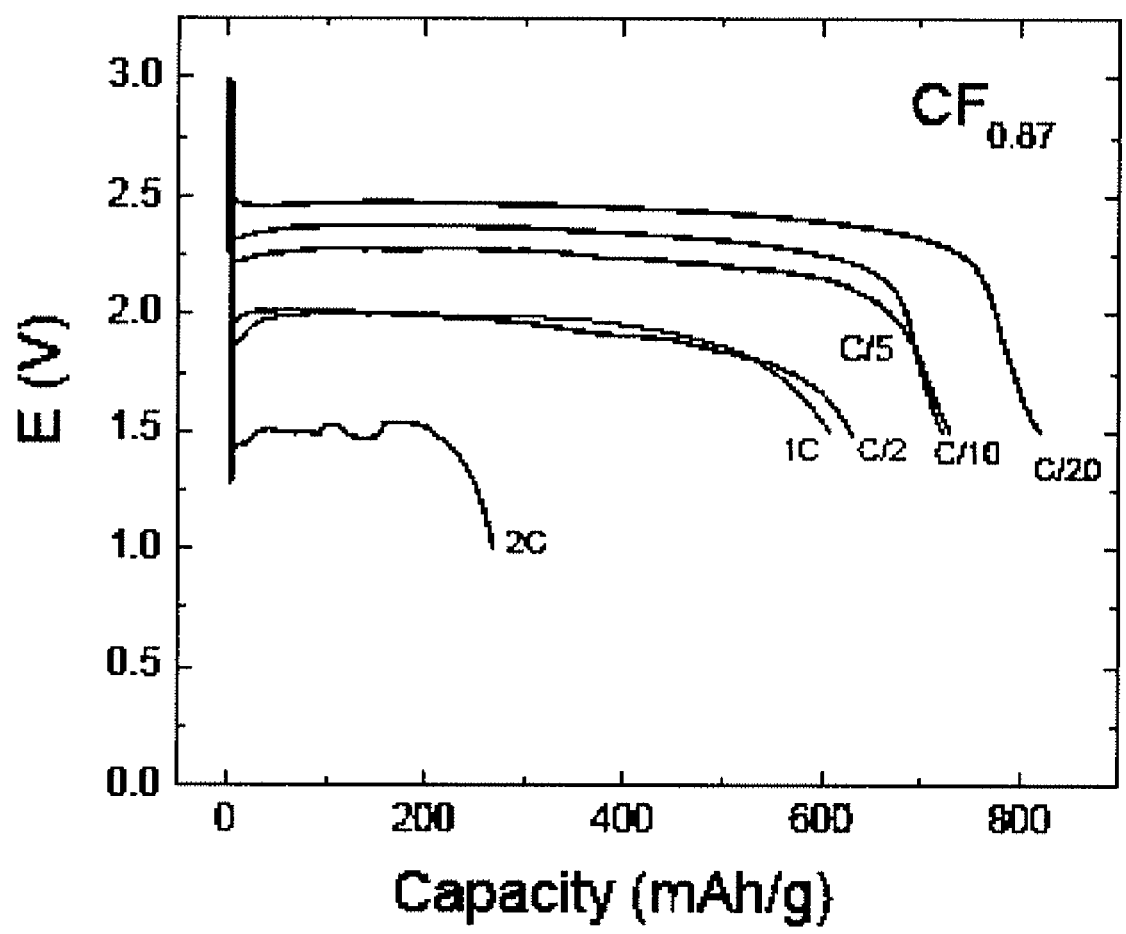
FIG. 19: Discharge curves for subfluorinated coke material $CF_{0.87}$.
Figure 20:
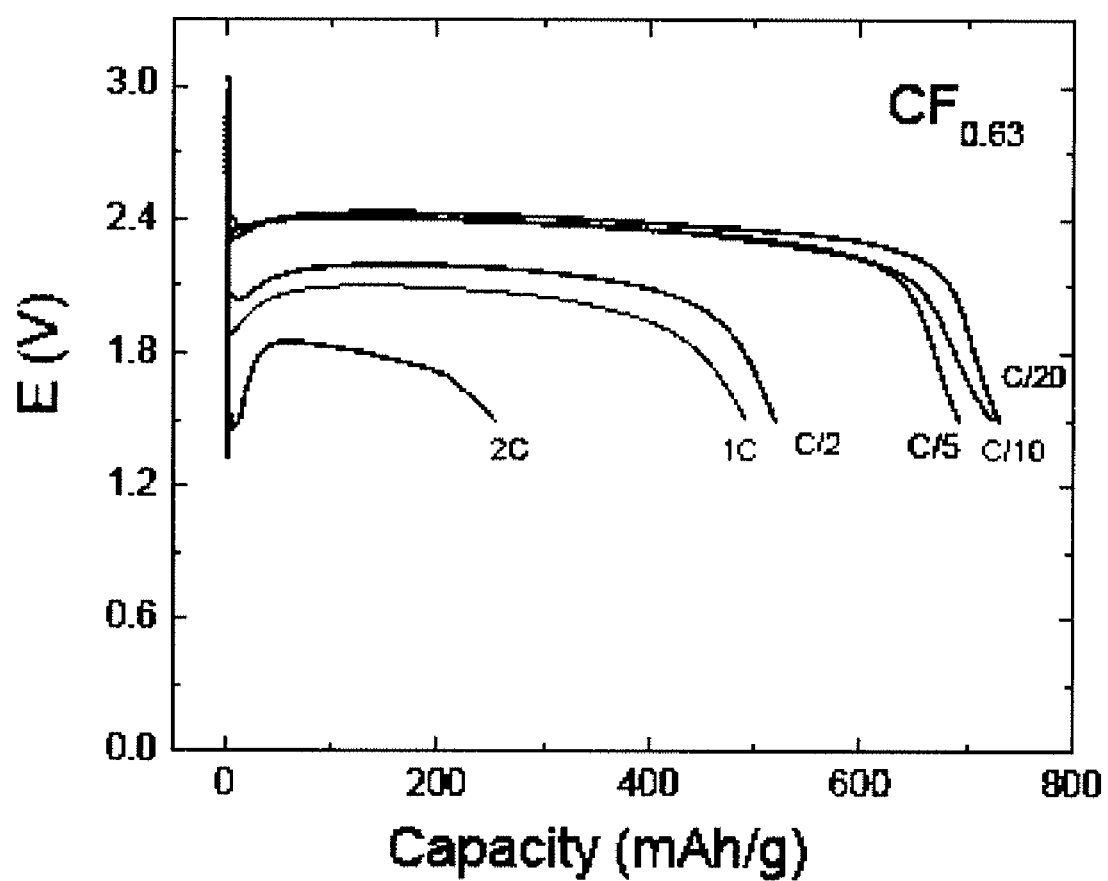
FIG. 20: Discharge curves for subfluorinated coke material $CF_{0.63}$.

Exemplary discharge profiles of Li/subfluorinated graphite cells are shown in FIGS. 7-10 and exemplary profiles of Li/subfluorinated coke cells are shown in FIGS. 18-20. These cells exhibit a characteristic plateau corresponding to the formation of LiF according to Equation 1. The value of the plateau voltage depends upon the discharge rate. The discharge profiles of these cells differ depending on the fluorine to carbon ratio of the subfluorinated material. In general, the higher F/C, the higher the discharge capacity, as indicated by Equation 2.

Subfluorinated carbonaceous materials can show reduced over-potential for low discharge times as compared to fully fluorinated materials. This is related to the decrease of electrical conductivity of the sample when the fluorinated parts progress i.e. the decrease of pristine carbon amount in the sample.

Figure 6:
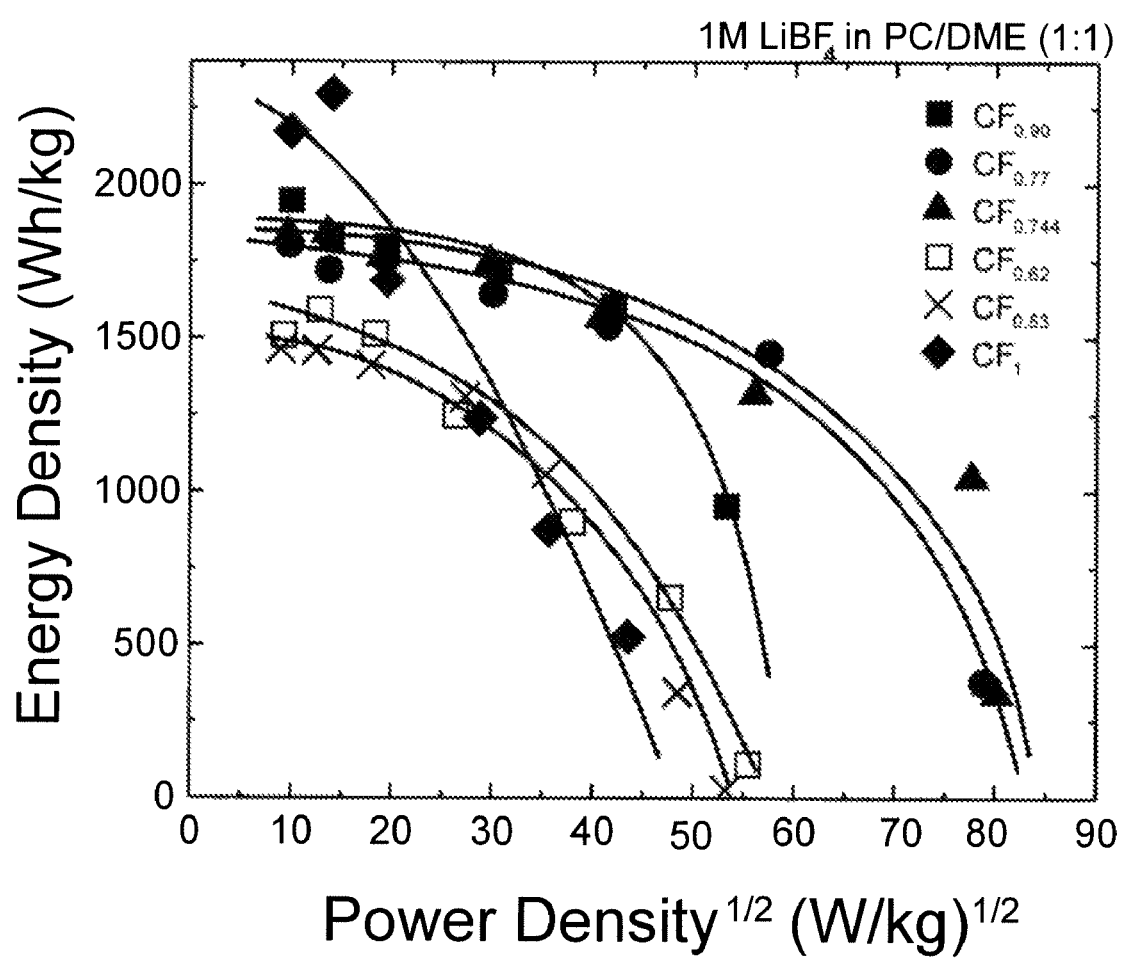
FIG. 6: Ragone plot for several subfluorinated graphites versus $CF_1$.
Figure 7:
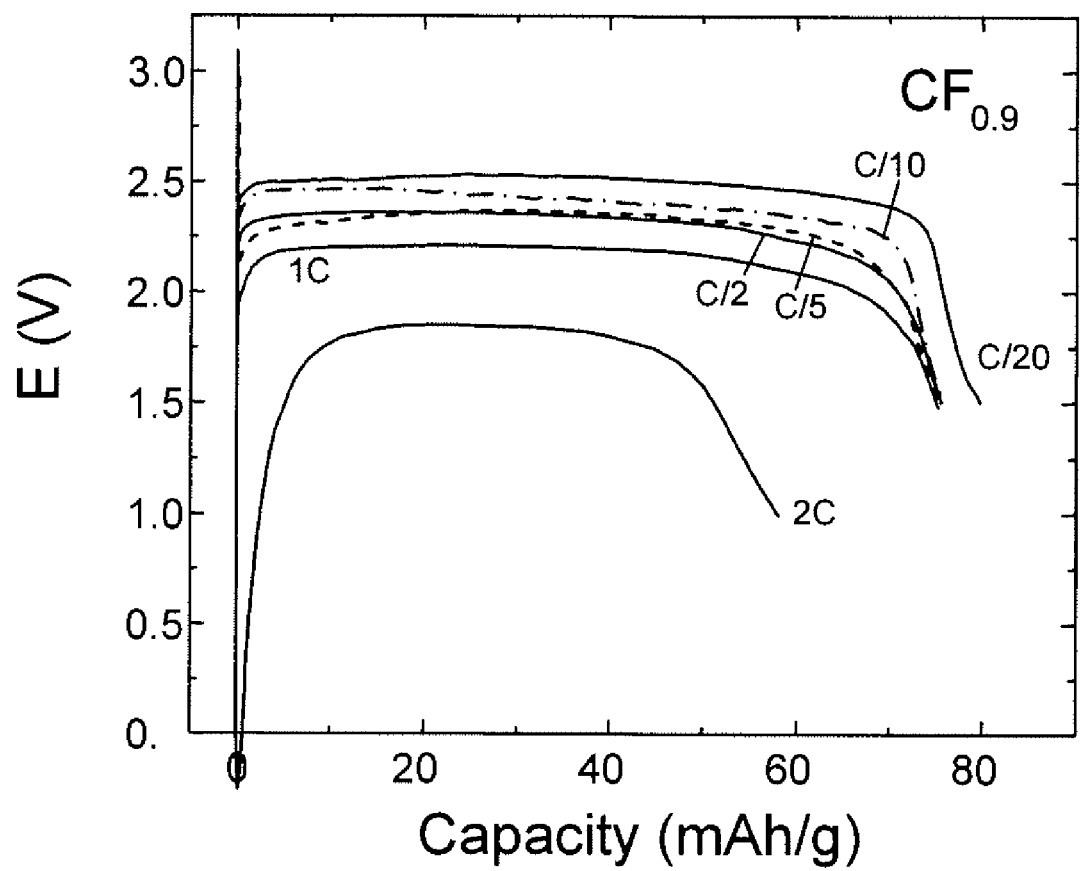
FIG. 7. Discharge curve for subfluorinated graphite $CF_{0.9}$.
Figure 8:
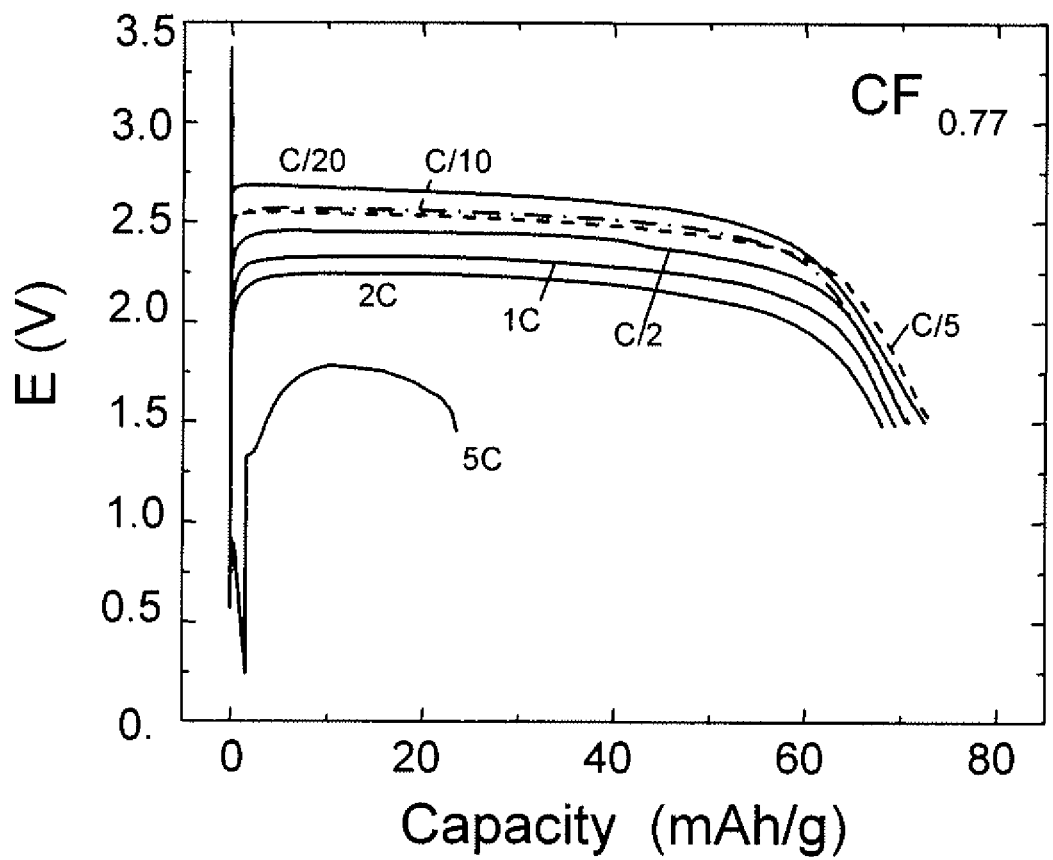
FIG. 8: Discharge curve for subfluorinated graphite $CF_{0.77}$.
Figure 9:
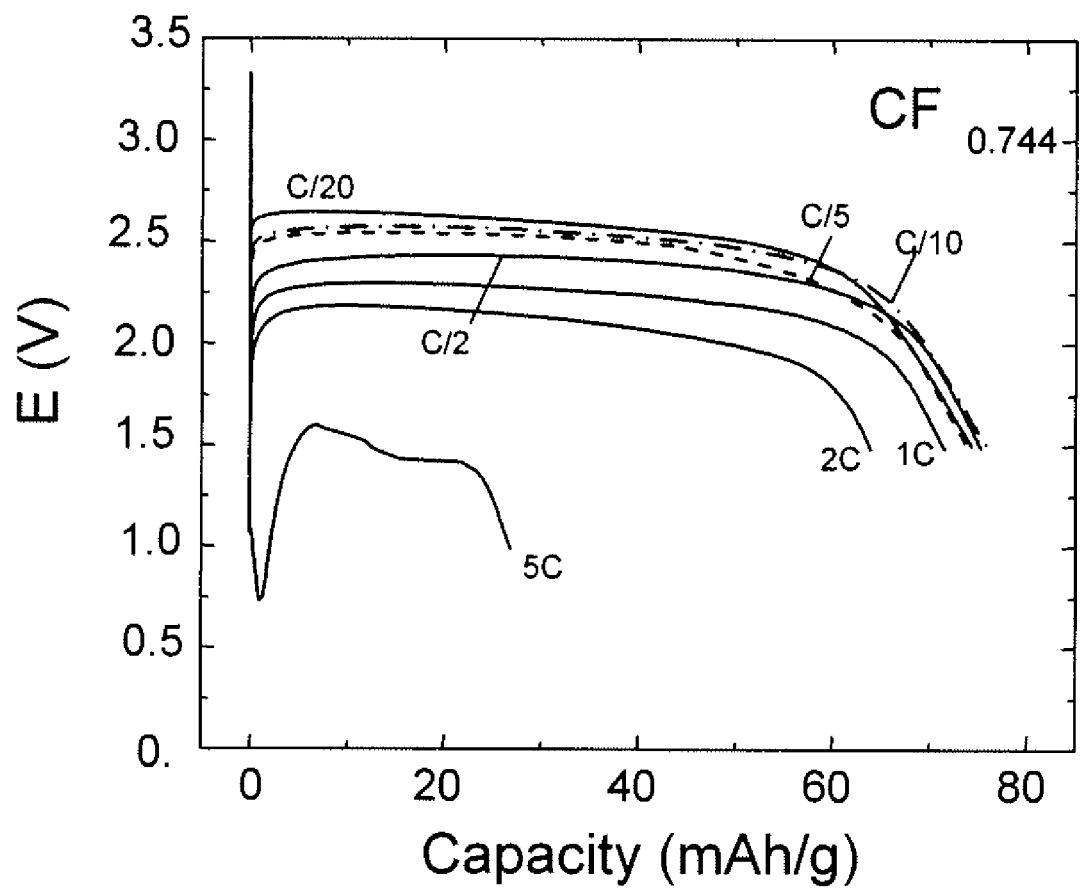
FIG. 9: Discharge curve for subfluorinated graphite $CF_{0.744}$.
Figure 10:
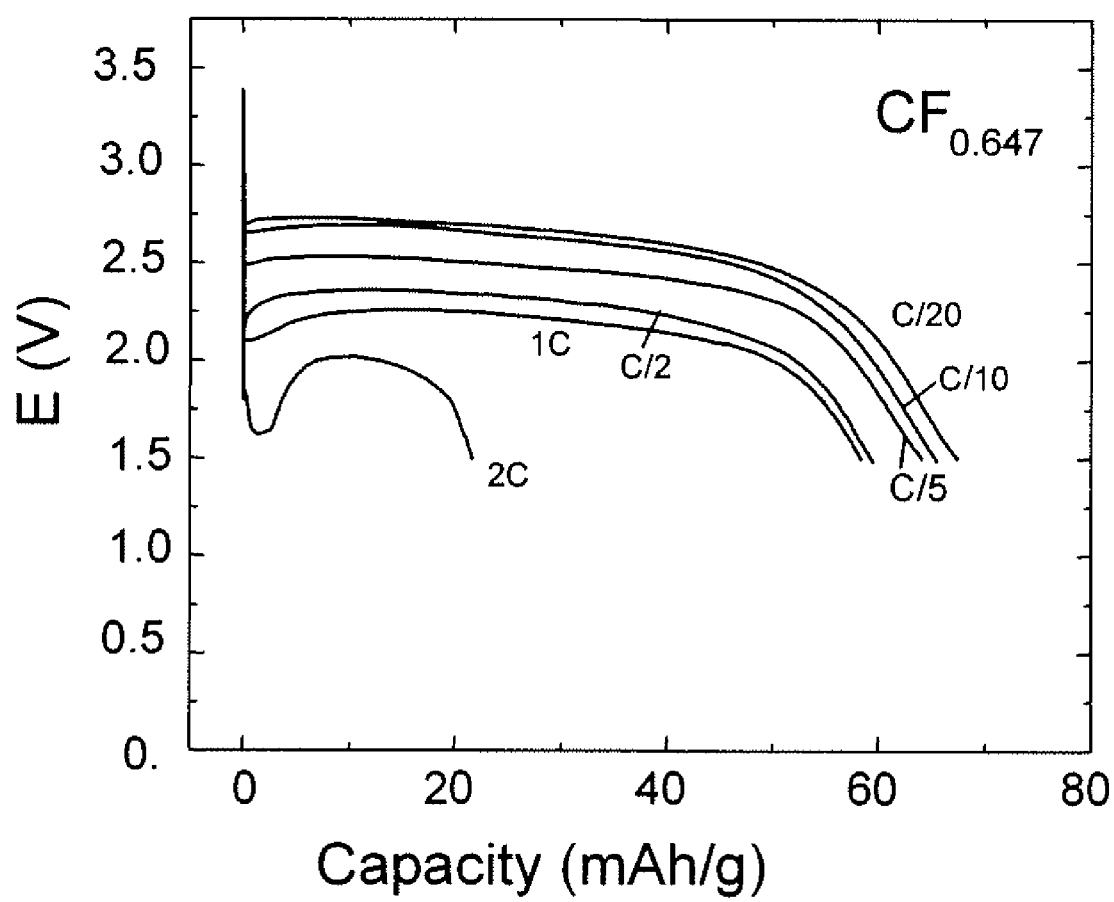
FIG. 10: Discharge curve for subfluorinated graphite $CF_{0.647}$.
Figure 11:
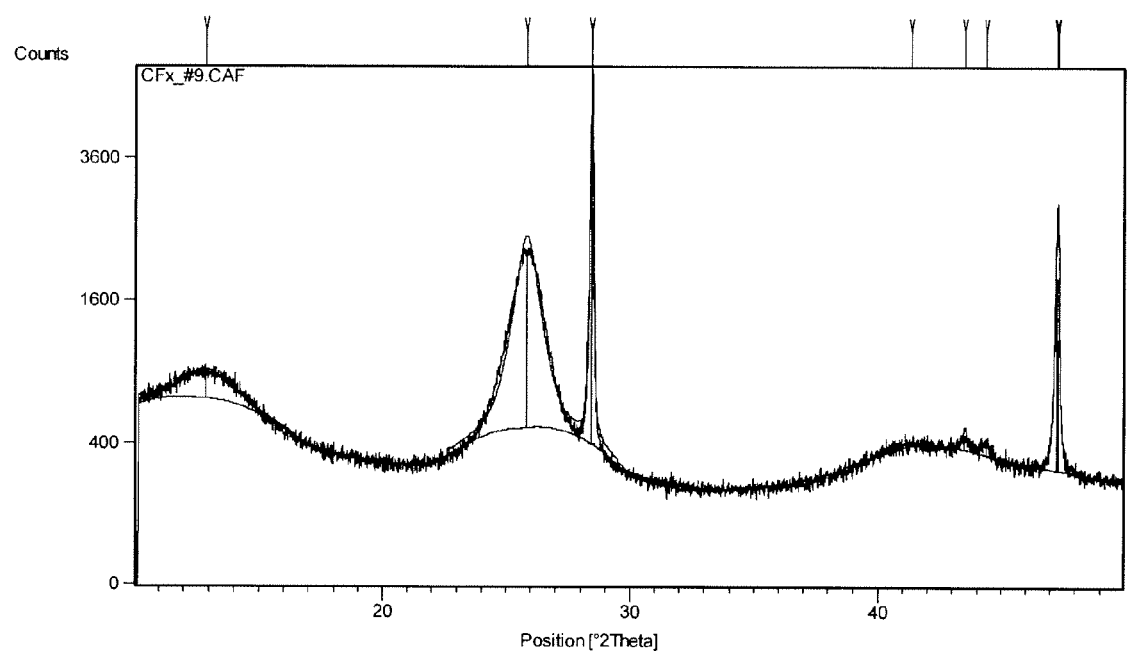
FIG. 11: X-ray diffraction spectrum for a subfluorinated coke material with an F/C ratio of 0.36.
Figure 12:
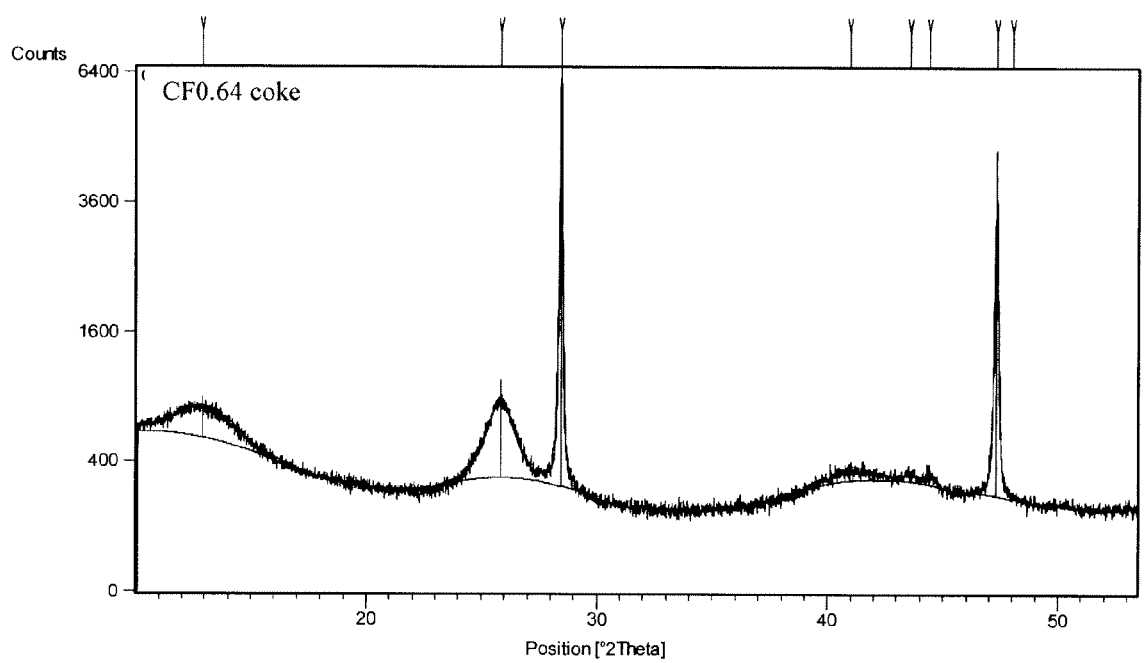
FIG. 12. X-ray diffraction spectrum for a subfluorinated coke material with an F/C ratio of 0.64.
Figure 13:
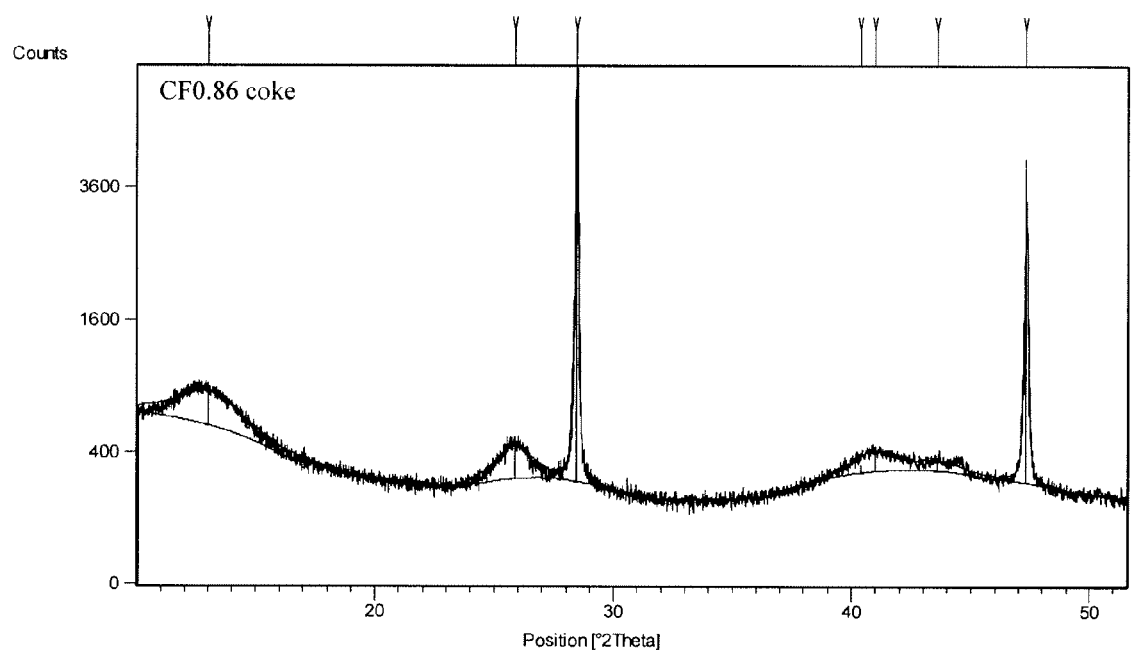
FIG. 13. X-ray diffraction spectrum for a subfluorinated coke material with an F/C ratio of 0.86.
Figure 14:
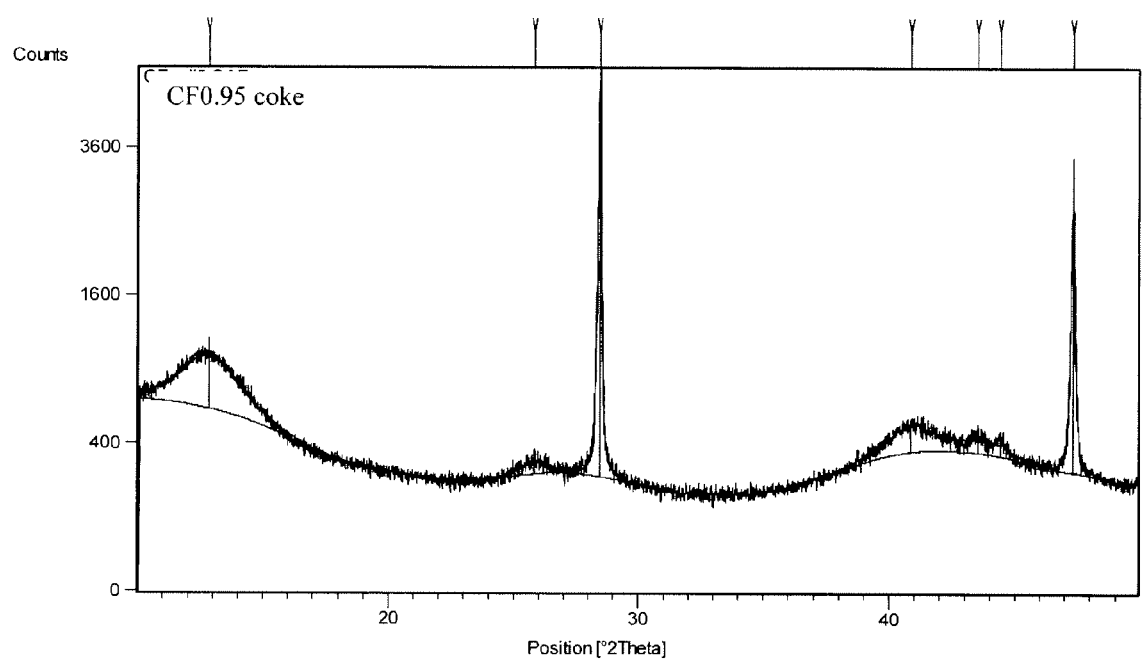
FIG. 14. X-ray diffraction spectrum for a subfluorinated coke material with an F/C ratio of 0.95.
Figure 17:
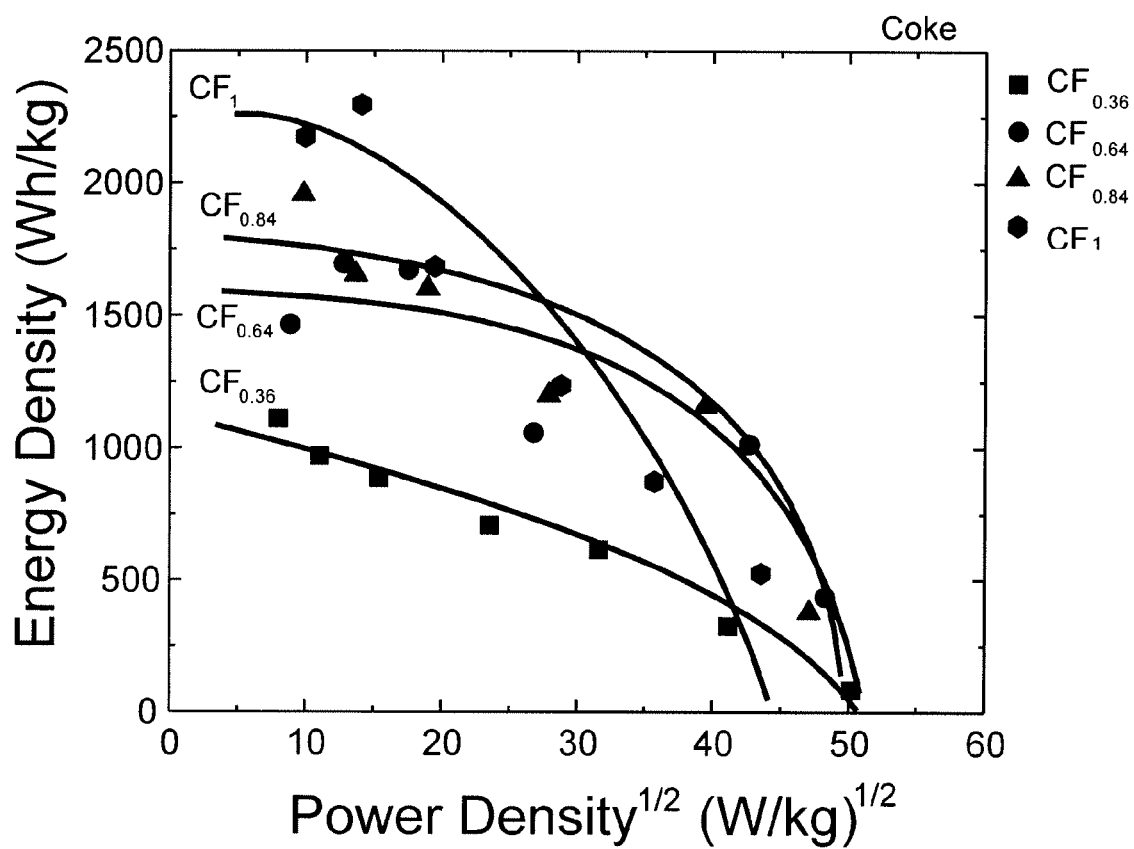
FIG. 17: Ragone plot for several subfluorinated coke materials versus $CF_1$.

In addition, cells including Li and subfluorinated carbonaceous material can display improved performance as compared to commercial Li/CF cells at higher discharge rates (e.g. at or above 1 C) and higher power densities. The latter can be seen by referring to a Ragone plot of energy density (Wh/kg) versus the square root of power density. As seen in FIGS. 6 and 17, both subfluorinated graphites and subfluorinated cokes can outperform CF1 at higher power densities.

In an embodiment, once the electrochemical cell is assembled, it may be "pre-discharged" before being put into actual use. The pre-discharge step involves discharging from 1%-5% of the capacity of the cell. Pre-discharge of the cell can eliminate the initial voltage delay before establishment of the voltage plateau which is seen in the characteristic discharge profile of a Li/subfluorinated carbonaceous material cells.

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric. All solvents were purchased as HPLC grade, and all reagents were obtained commercially unless otherwise indicated.

Example 1

Synthesis of Subfluorinated Graphite

Graphite ((10 to 30 grams, quantity, M, of Natural Graphite of Madagascar 7.5 µm or Artificial Graphite 15-20 µm distributed on a nickel plate, 0.2 g/cm$^2$) was placed into the nickel reactor (4 liter), and dried under vacuum at room temperature during 2 hours. Then, fluorine gas (99.90% purity) was introduced up to 1 atmosphere and after, using open system reactor, fluorine was flowed with controlled rate (FL g/hour). Afterward, the temperature was regularly increased (1° C./min) to the final temperature T (° C.) and was maintained during H hours. At the end of the reaction, the furnace was cooled to room temperature. Next, the excess of fluorine was evacuated under dry nitrogen flow during 3 hours. (Note: F/C molar ratios of the subfluorinated graphites were measured by the weight uptake method.)

Synthesis of CF0.63
Graphite mass M=30 g
Fluorine flow rate FL=2 g/hour
Reaction time H=17 hours
Reaction temperature T=390° C.

Synthesis of CF0.74
Graphite mass M=30 g
Fluorine flow rate FL=2 g/hour
Reaction time H=19 hours
Reaction temperature T=390° C.

Synthesis of CF0.77
Graphite mass M=30 g
Fluorine flow rate FL=2 g/hour
Reaction time H=20 hours
Reaction temperature T=390° C.

Synthesis of CF0.71
Graphite mass M=13 g
Fluorine flow rate FL=1 g/hour
Reaction time H=14 hours
Reaction temperature T=490° C.

Synthesis of CF0.71
Graphite mass M=13 g
Fluorine flow rate FL=1 g/hour
Reaction time H=31 hours
Reaction temperature T=390° C.

Synthesis of CF0.74
Graphite mass M=30 g
Fluorine flow rate FL=2 g/hour
Reaction time H=17 hours
Reaction temperature T=490° C.

Synthesis of CF0.85
Graphite mass M=30 g
Fluorine flow rate FL=2 g/hour
Reaction time H=20 hours
Reaction temperature T=490° C.

Example 2

Characterization of Subfluorinated Graphites

FIG. 1 shows X-ray diffraction spectra for a subfluorinated graphite materials with range of F/C ratios. The spectra show peaks characteristic of a fluorographite matrix at 2θ between approximately 10 and 15 degrees and between approximately 40 and 45 degrees. A peak at 2θ=26.3, which is the position characteristic of the (002) graphite peak, is clearly observed for $CF_{0.34}$, $CF_{0.48}$ and $CF_{0.57}$. The X-ray diffraction (XRD) powder patterns were obtained using a diffractometer with $Cu(K_\alpha)$ radiation (λ=1.5406 Å). The spectra plot intensity (counts) vs. 2θ.

Figure 2:
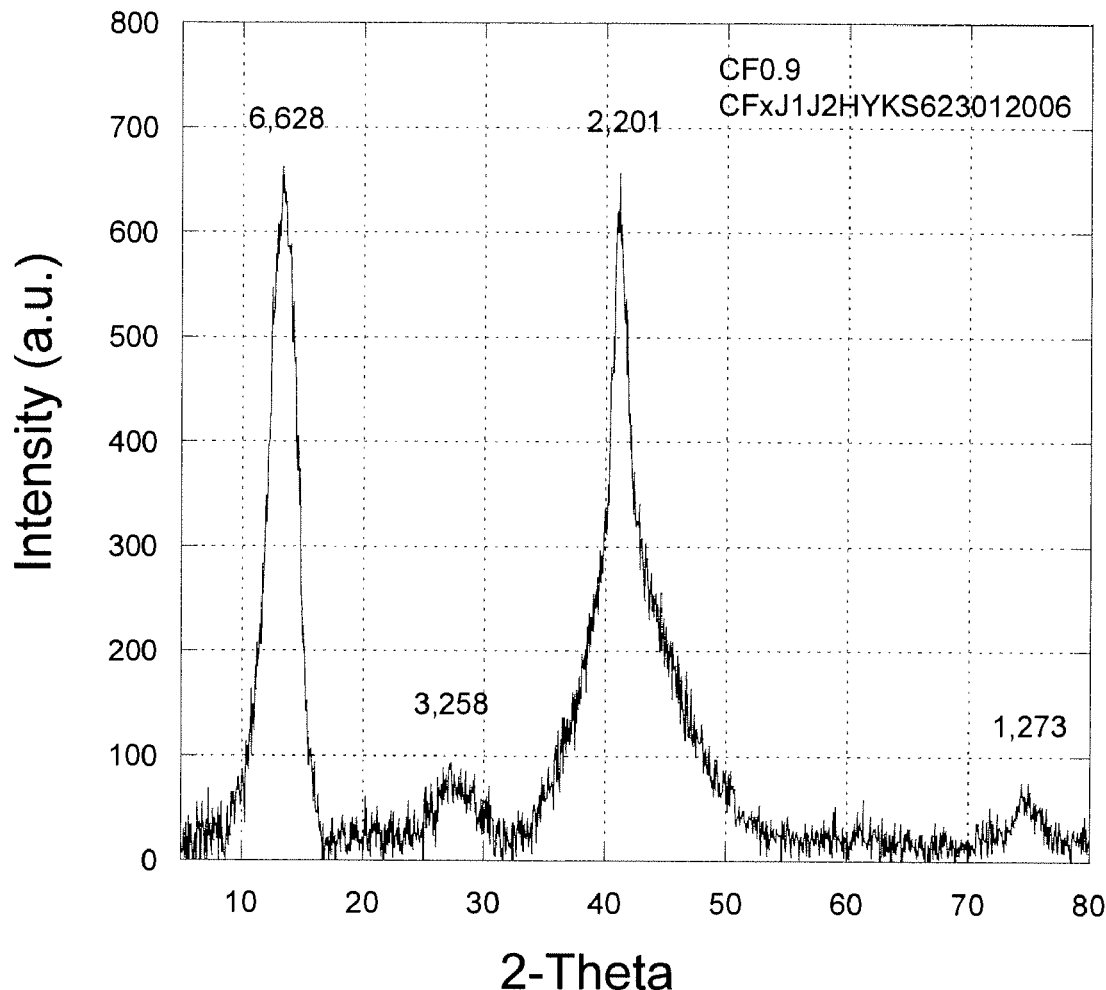
FIG. 2. X-ray diffraction spectrum for a subfluorinated graphite material with an F/C ratio of 0.9. The labels above the peaks are the calculated d-spacings.

FIG. 2 shows an enlarged view of an X-ray diffraction spectrum for a subfluorinated graphite material with an F/C ratio of 0.9. The spectrum shows peaks characteristic of a fluorographite matrix at 2θ of approximately 13 degrees (002) and approximately 41 degrees (100). Additional peaks are located at 2θ of approximately 28 degrees (004) and 75 degrees (110). The labels above the peaks are the calculated d-spacings (e.g the label 6,628 corresponds to a spacing of 6.628 Angstroms). The spacings (d) calculated are 6.628 Angstroms for (002), 3.258 Angstroms for (004), 2.201 Angstroms for (100) and 1.273 Angstroms for (110). No peak is observed at 2θ=26.3, which is the position characteristic of the (002) graphite peak. The (hkl) Miller indexes relate to a hexagonal symmetry of the subfluorinated graphite material crystal structure and of graphite. The d-value of 6.628 Angstroms of the (002) line is the average d-spacing between the fluorinated carbon layers.

Figure 3:
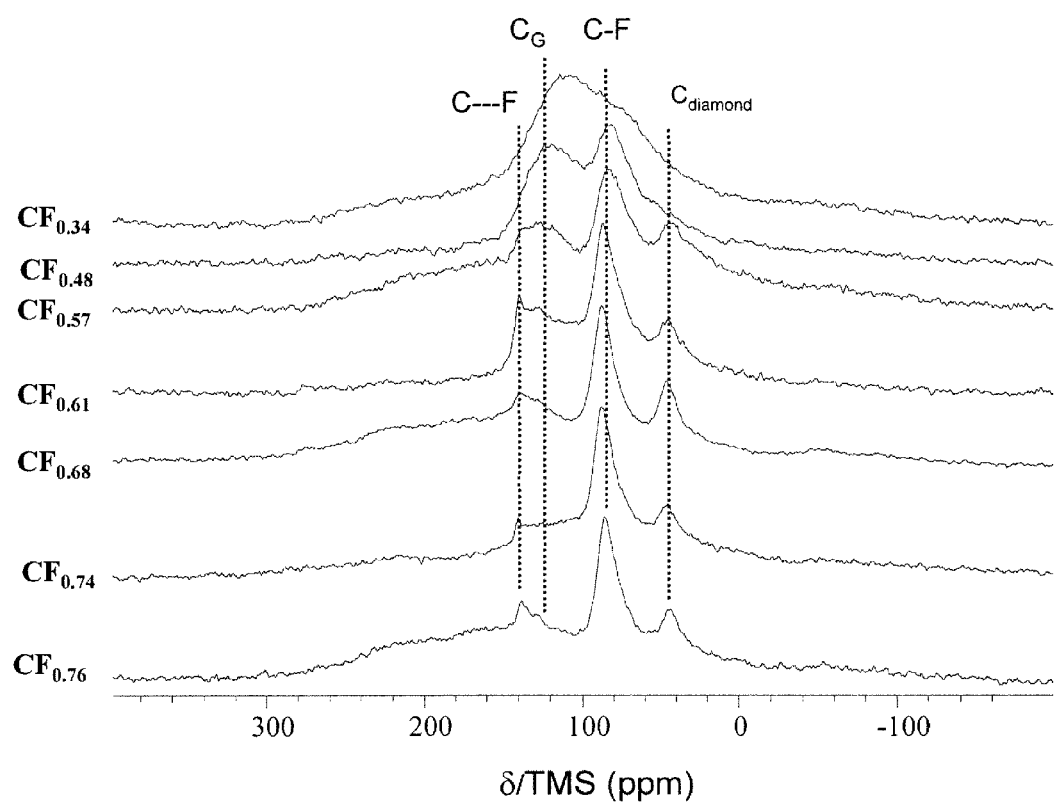
FIG. 3: $^{13}C$ Magic Angle Spinning (MAS) Nuclear Magnetic Resonance (NMR) spectra for several subfluorinated graphite materials. (10 kHz)

FIG. 3 shows $^{13}C$ Magic Angle Spinning (MAS) Nuclear Magnetic Resonance (NMR) spectra for several subfluorinated graphite materials. (10 kHz). The subfluorinated graphite materials were synthesized at a reaction temperature of 390° C. The dotted lines overlaid on the spectra indicate the characteristic positions of peaks for diamond-like sp$^3$-hybridized carbon atoms (at 42-43 ppm/TMS) and carbon in strong interaction with fluorine (C—F) (at about 88 ppm/TMS), and the observed positions attributed to graphite-like sp$^2$-hybridized carbon atoms ($C_G$) (at about 120 ppm/TMS) and carbon atoms in weak interaction with fluorine (C—F) (at about 140 ppm/TMS).

Figure 4:
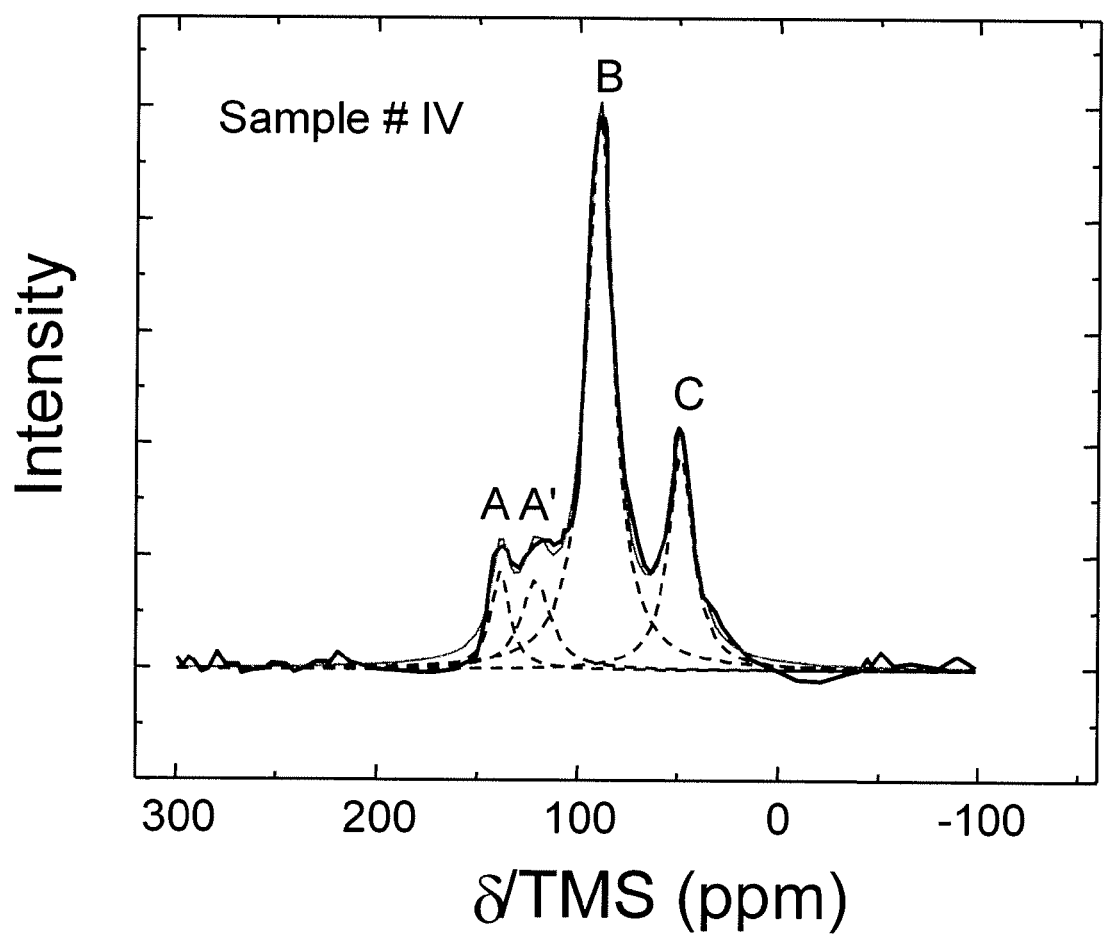
FIG. 4: $^{13}C$ NMR spectrum for a subfluorinated graphite material having an F/C ratio of 0.77.

FIG. 4 shows a $^{13}C$ NMR spectrum for a subfluorinated graphite material having an F/C ratio of 0.9. In FIG. 4, the peak attributed to diamond-like sp$^3$-hybridized carbon atoms has been labeled C and the peak attributed to carbon in strong interaction with fluorine (C—F) has been labeled B. The combination of peaks A and A' is associated with the contribution of graphite-like sp$^2$-hybridized carbon atoms and carbon atoms in weak interaction with fluorine (C—F). Peak A is more closely associated with carbon atoms in weak interaction with fluorine while peak A' is more closely associated with graphite-like sp$^2$-hybridized carbon atoms. In order to quantify the relative areas of the peaks, the data was normalized with a Lorentzian function and deconvoluted (Origin 7.5 software, OriginLab). The result is shown by the dashed lines in FIG. 4. The sum of the area of deconvoluted peaks A and A' divided by the sum of the area of deconvoluted peaks A, A', B and C is 19%. Similar area ratios for A and A', respectively, are 8% and 11%.

Figure 5:
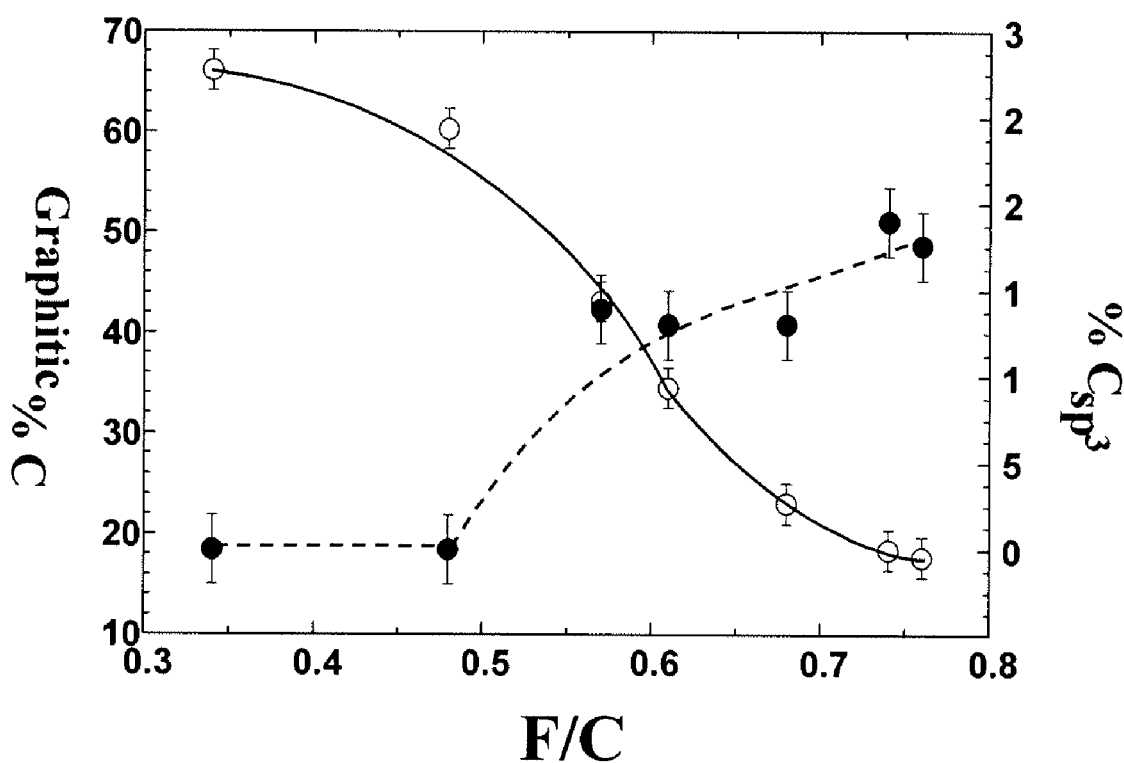
FIG. 5: Plot of % $C_{graphitic}$ and % $C_{sp3}$ versus the F/C ratio for several subfluorinated graphites synthesized at 390° C.

Table 1 shows data obtained for CF1 and subfluorinated graphites with F/C ratios of 0.65, 0.77, and 0.9. FIG. 5 is a plot of the percent of graphitic carbon and sp$^3$ type carbon versus F/C ratio derived from the spectra in FIG. 3.

TABLE 1

| CFx | A Peak Position (ppm) | A Area Ratio | A' Peak Position (ppm) | A' Area Ratio | B Peak Position (ppm) | B Area Ratio | C Peak Position (ppm) | C Area Ratio |
|---|---|---|---|---|---|---|---|---|
| $CF_{0.65}$ | 130 | 54% | 102 | 13% | 87 | 23% | 46 | 10% |
| $CF_{0.77}$ | 131 | 7% | 116 | 8% | 84 | 51% | 43 | 34% |
| $CF_{0.9}$ | 138 | 8% | 121 | 11% | 89 | 60% | 49 | 21% |
| $CF_1$ | n/a | n/a | n/a | n/a | 85 | 94% | 44 | 6% |

Example 3

Electrochemical Properties of Subfluorinated Graphite

For the electrochemical tests, the positive electrodes were composed of subfluorinated carbonaceous material, a conductive material and a binder. The positive electrode was then mounted in a two electrode cell where the electrolyte was composed of a 1 mol·L$^{-1}$ solution of LiBF$_4$ dissolved in propylene carbonate (PC) and dimethyl ether (DME). A microporous polyethylene or polypropylene film containing the electrolyte was sandwiched between the graphite fluoride electrode and a lithium metal foil.

FIG. 6 shows a Ragone plot of energy density versus the square root of power density. Subfluorinated graphites $CF_{0.90}$, $CF_{0.77}$ and $CF_{0.744}$ have significantly higher energy densities than CF for power densities greater than 625 W/kg.

FIGS. 7-10 show discharge profiles for subfluorinated graphites $CF_{0.9}$, $CF_{0.77}$, $CF_{0.744}$, and $CF_{0.647}$, respectively. The electrode thicknesses were approximately 80 microns, 40 microns, 40 microns and 120 microns, respectively.

Example 4

Synthesis of Subfluorinated Coke

Coke (quantity, M, is 2 grams distributed on nickel boat) was placed into the nickel reactor (1 liter), and dried under vacuum at room temperature during 2 hours. Then, fluorine gas (99.90% purity) was introduced up to 1 atmosphere and after, using open system reactor, fluorine was flowed with controlled rate (FL g/hour). Afterward, the temperature was regularly increased (1° C./min) to the final temperature T (° C.) and was maintained during H hours. At the end of the reaction, the furnace was cooled to room temperature. Next, the excess of fluorine was evacuated under dry nitrogen flow during 1 hours. (Note: F/C molar ratios of the subfluorinated cokes were measured by the weight uptake method.)

It was observed that Coke is more reactive than graphite or carbon nanotubes, for example: at 390° C. during 16 hours with F2, FL=1 g/hour, MWCNT gives $CF_{0.09}$ (small fluorinated), graphite forms CF 0.7 but $CF_{1.13}$ is formed with coke.

Combustion Reaction (Final Mass Decreasing) CF1.3 Product
Coke mass M=2 g
Fluorine flow rate FL=2 g/hour
Reaction time H=4.5 hours
Reaction temperature T=400° C.
  Synthesis of CF0.5
Coke mass M=2 g
Fluorine flow rate FL=1.8 g/hour
Reaction time H=3 hours
Reaction temperature T=400° C.
  Synthesis of CF0.40
Coke mass M=2 g
Fluorine flow rate FL=0.5 g/hour
Reaction time H=12 hours
Reaction temperature T=370° C.
  Synthesis of CF0.19
Coke mass M=2 g
Fluorine flow rate FL=1.2 g/hour
Reaction time H=12 hours
Reaction temperature T=350° C.
  Synthesis of CF0.57
Coke mass M=2 g
Fluorine flow rate FL=1.2 g/hour
Reaction time H=6 hours
Reaction temperature T=390° C.
  Synthesis of CF0.73
Coke mass M=2 g
Fluorine flow rate FL=1.2 g/hour
Reaction time H=7.5 hours
Reaction temperature T=390° C.
  Synthesis of CF0.63
Coke mass M=2 g
Fluorine flow rate FL=1.2 g/hour
Reaction time H=6.5 hours
Reaction temperature T=390° C.
  Synthesis of CF0.87
Coke mass M=2 g
Fluorine flow rate FL=1.2 g/hour
Reaction time H=8.5 hours
Reaction temperature T=390° C.
  Synthesis of CF0.91
Coke mass M=2 g
Fluorine flow rate FL=1.2 g/hour
Reaction time H=9.5 hours
Reaction temperature T=390° C.

Example 5

Characterization of Subfluorinated Coke

FIGS. 11-14 show x-ray diffraction spectra for a subfluorinated coke materials with F/C=0.36, 0.64, 0.86, and 0.95, respectively. The spectrum shows peaks for fluorinated phases at 2θ equal to approximately 13 degrees, 41 degrees, 43.5 and 44.4 degrees, a peak for a coke phase at 2θ equal to approximately 25.8 degrees, and peaks for the silicon reference at 2θ equal to approximately 28.4 and 47.3 degrees. The height of the peak associated with the coke phase decreases with increasing F/C, as expected.

Table 2 gives typical XRD diffraction results for a $CF_x$ material with F/C=0.65 (10°<2θ<50°, Cu Kα) with diffraction peaks assignment. In Table 2, FWHM is the full width at half maximum. The crystallite size calculated by the Scherrer equation gives here Lc=7.5 nm for the coke material using the (002) line of coke at 2θ=25.83 degrees.

TABLE 2

| CF0.65 Peak # | Pos. [°2Th.] | Height [cts] | FWHM [°2Th.] | d-spacing [Å] | Rel. Int. [%] | Peak Assignment |
|---|---|---|---|---|---|---|
| 1 | 12.8679 | 336.9 | 2.619 | 6.87412 | 4.19 | 002 CFx |
| 2 | 25.8331 | 751.55 | 1.2271 | 3.44605 | 9.35 | 002 coke |
| 3 | 28.4425 | 8034.08 | 0.1383 | 3.13554 | 100 | 111 Si |
| 4 | 40.9818 | 75.25 | 1.7746 | 2.20049 | 0.94 | 100 CFx |
| 5 | 43.5464 | 31.73 | 1.8638 | 2.07665 | 0.39 | 101 CFx |
| 6 | 44.4171 | 69.68 | 0.3421 | 2.03794 | 0.87 | 102/006 CFx |
| 7 | 47.3045 | 4407.04 | 0.1603 | 1.92006 | 54.85 | 220 Si |

FWHM = full width at half maximum

Figure 15:
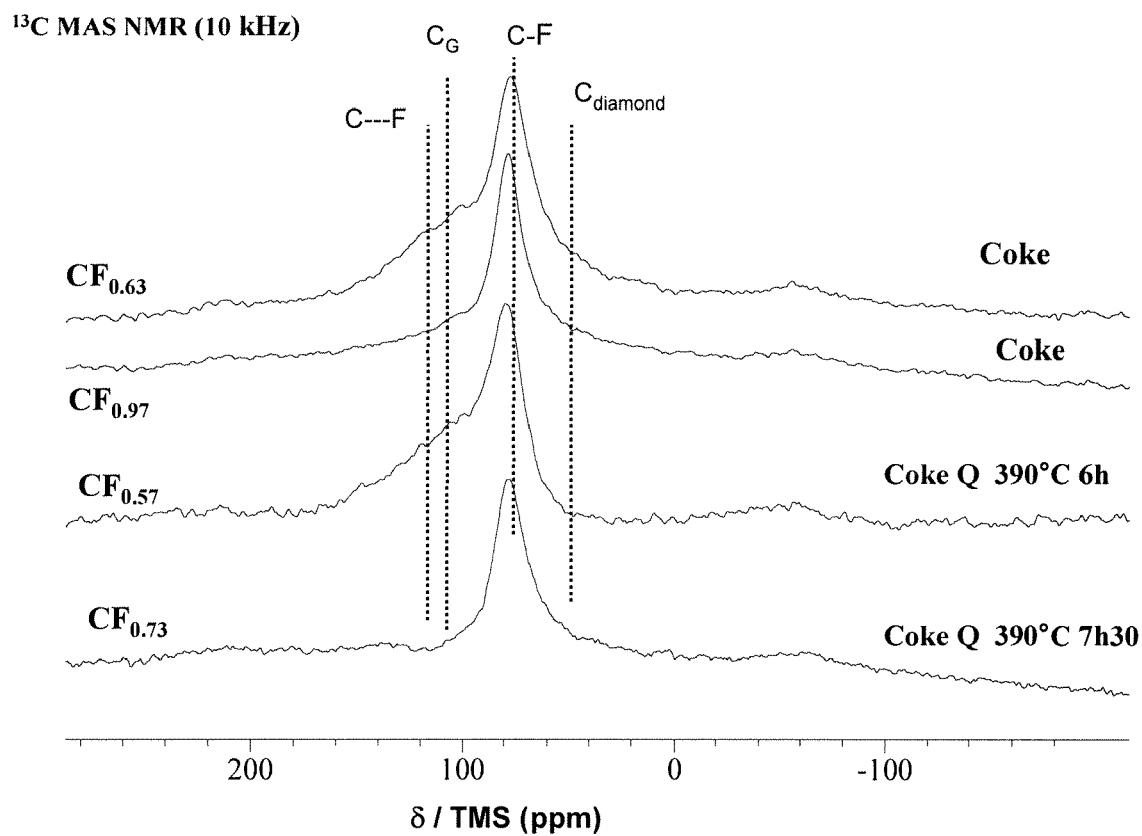
FIG. 15: $^{13}C$ Magic Angle Spinning (MAS) Nuclear Magnetic Resonance (NMR) spectra for several subfluorinated coke materials. (10 kHz)

FIG. 15 shows $^{13}$C Magic Angle Spinning (MAS) Nuclear Magnetic Resonance (NMR) spectra for several subfluorinated coke materials. (10 kHz). The dotted lines overlaid on the spectra indicate the characteristic positions of peaks for diamond-like sp$^3$-hybridized carbon atoms (at 42-43 ppm/TMS) and carbon in strong interaction with fluorine (C—F) (at about 88 ppm/TMS), and the observed positions attributed to graphite-like sp$^2$-hybridized carbon atoms ($C_G$) (at about 120 ppm/TMS) and carbon atoms in weak interaction with fluorine (C—F) (at about 140 ppm/TMS).

Figure 16:
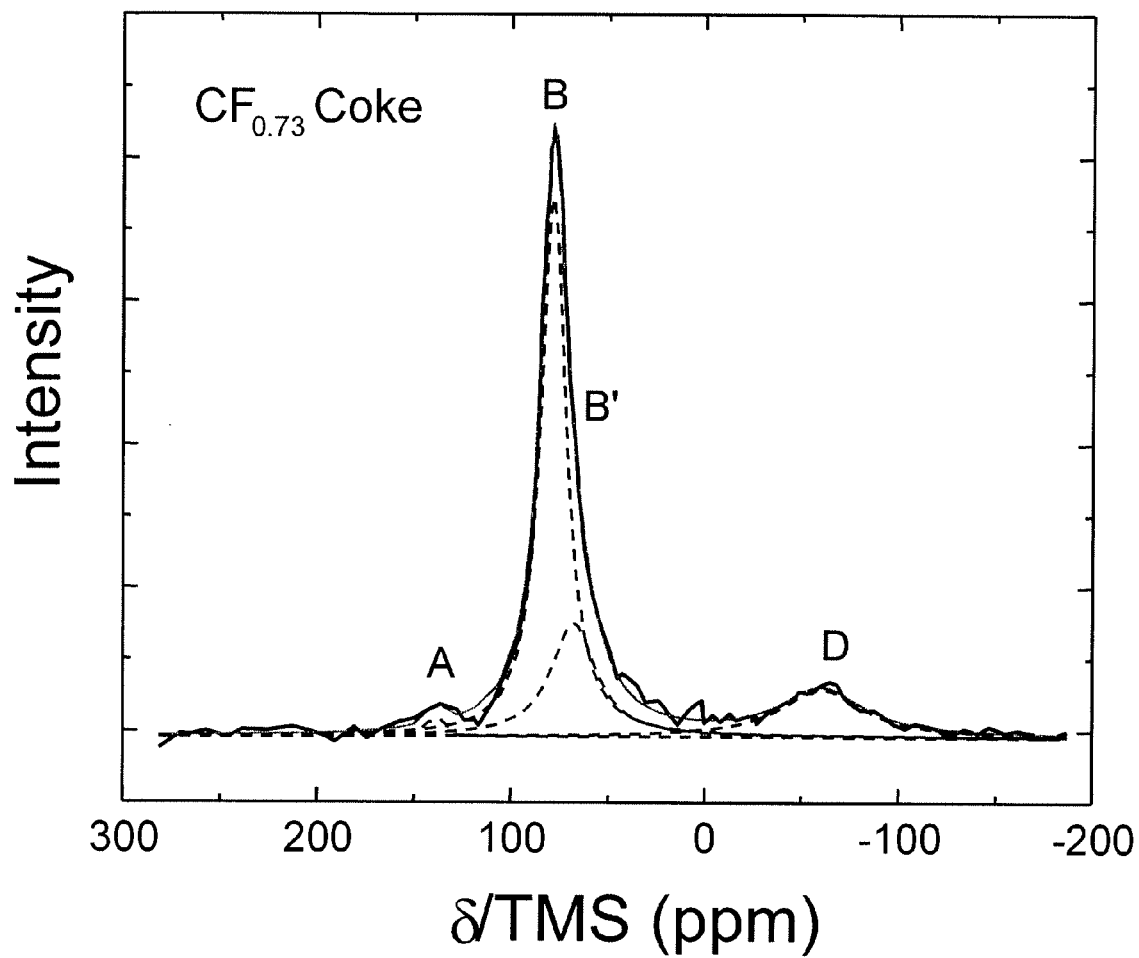
FIG. 16: $^{13}C$ NMR spectrum for a subfluorinated coke material having an F/C ratio of 0.73.

FIG. 16 shows an NMR spectrum for a subfluorinated coke material with F/C=0.73. The deconvoluted peaks are shown with dashed lines. In contrast to the NMR spectra for subfluorinated graphites, distinct peaks for unfluorinated carbon and carbon in weak association with fluorine are not seen. Therefore, only one peak was fitted in this area (shown as A in FIG. 16). Two additional peaks at lower chemical shift values, B' and D are also seen. Table 3 shows normalized values of the peak areas.

TABLE 3

| Material | Peak(s) A/A' Peak Position (ppm) | Peak(s) A/A' Area Ratio | Peak B Peak Position (ppm) | Peak B Area Ratio | Peak B' Peak Position (ppm) | Peak B' Area Ratio | Peak D Peak Position (ppm) | Peak D Area Ratio |
|---|---|---|---|---|---|---|---|---|
| CF0.97 (Coke) | n/a | n/a | 78 | 51% | 77 | 40% | −59 | 9% |
| CF0.73 (Coke) | 139 | 2% | 78 | 59% | 68 | 22% | −60 | 17% |
| CF0.64 (Coke) | 109 | 34% | 77 | 48% | 64 | 13% | −57 | 5% |
| CF0.57 (Coke) | 113 | 41% | 78 | 33% | 90 | 16% | −54 | 10% |

Example 6

Electrochemical Properties of Subfluorinated Coke

For the electrochemical tests, the positive electrodes were composed of subfluorinated carbonaceous material, a conductive material and a binder. The positive electrode was then mounted in a two electrode cell where the electrolyte was composed of a 1 mol·L$^{-1}$ solution of LiBF$_4$ dissolved in propylene carbonate (PC) and dimethyl ether (DME). A microporous polyethylene or polypropylene film containing the electrolyte was sandwiched between the graphite fluoride electrode and a lithium metal foil.

FIG. 17 shows a Ragone plot of energy density versus the square root of power density. Subfluorinated cokes CF$_{0.64}$ and CF$_{0.84}$ have significantly higher energy densities than CF for power densities greater than 900 W/kg.

FIGS. 18-20 show discharge profiles for subfluorinated coke material CF$_{0.97}$, CF$_{0.87}$, and CF$_{0.63}$, respectively.

Table 4 presents electrochemical data for subfluorinated Coke Materials. In Table 4, <e> is the average discharge voltage under a fixed discharge rate, Q=achieved discharge capacity (mAh/g) and E=achieved energy density (Wh/kg).

TABLE 4

| x | Discharge | <e> (V) | Q (mAh/g) | (Wh/kg) |
|---|---|---|---|---|
| 1.2 | C/20 | 2.33 | 875 | 1892 |
|  | C/10 | 2.19 | 841 | 1707 |
|  | C/5 | 2.14 | 779 | 1686 |
|  | C/2 | 2.10 | 634 | 1321 |
|  | 1C | 1.42 | 245 | 305 |
| 1.14 | C/20 | 2.37 | 821 | 1847 |
|  | C/10 | 2.36 | 800 | 1811 |
|  | C/5 | 2.34 | 796 | 1754 |
|  | C/2 | 2.08 | 711 | 1421 |
|  | 1C | 1.03 | 344 | 320 |
| 1.09 | C/20 | 2.35 | 810 | 1835 |
|  | C/10 | 2.32 | 782 | 1750 |
|  | C/5 | 2.22 | 787 | 1676 |
|  | C/2 | 2.18 | 739 | 1556 |
|  | 1C | 1.65 | 461 | 701 |
|  | 2C | 0.86 | 266 | 202 |
| 1.03 | C/20 | 2.48 | 1062 | 2173 |
|  | C/10 | 2.38 | 1013 | 2296 |
|  | C/5 | 2.32 | 111 | 1685 |
|  | C/2 | 2.06 | 590 | 1237 |
|  | 1C | 1.67 | 572 | 874 |
|  | 2C | 1.25 | 489 | 526 |
| 1.01 | C/20 | 2.43 | 856 | 1969 |
|  | C/10 | 2.41 | 833 | 1908 |
|  | C/5 | 2.34 | 850 | 1906 |
|  | C/2 | 2.01 | 748 | 1428 |
|  | 1C | 1.84 | 562 | 809 |
|  | 2C | 1.68 | 156 | 48 |
| 0.97 | C/20 | 2.39 | 803 | 1847 |
|  | C/10 | 2.33 | 838 | 1825 |
|  | C/5 | 2.28 | 720 | 1581 |
|  | C/2 | 1.97 | 710 | 1388 |
|  | 1C | 1.63 | 480 | 745 |
|  | 2C | 1.28 | 390 | 408 |

TABLE 4-continued

| x | Discharge | <e> (V) | Q (mAh/g) | (Wh/kg) |
|---|---|---|---|---|
| 0.87 | C/20 | 2.46 | 820 | 1956 |
|  | C/10 | 2.36 | 721 | 1653 |
|  | C/5 | 2.27 | 729 | 1602 |
|  | C/2 | 1.98 | 631 | 1200 |
|  | 1C | 1.99 | 608 | 1158 |
|  | 2C | 1.51 | 268 | 378 |
| 0.63 | C/20 | 2.42 | 730 | 1467 |
|  | C/10 | 2.37 | 723 | 1696 |
|  | C/5 | 2.37 | 692 | 1673 |
|  | C/2 | 2.17 | 520 | 1057 |
|  | 1C | 2.07 | 491 | 1015 |
|  | 2C | 1.79 | 253 | 435 |
| 0.37 | C/20 | 2.55 | 454 | 1109 |
|  | C/10 | 2.43 | 416 | 970 |
|  | C/5 | 2.37 | 390 | 886 |
|  | C/2 | 2.21 | 334 | 707 |
|  | 1C | 2.00 | 326 | 616 |
|  | 2C | 1.72 | 203 | 327 |
|  | 5C | 1.13 | 91 | 85 |
| 0.18 | C/20 | 2.58 | 501 | 1317 |
|  | C/10 | 2.48 | 423 | 1024 |
|  | C/5 | 2.42 | 384 | 901 |

TABLE 4-continued

| x | Discharge | <e> (V) | Q (mAh/g) | (Wh/kg) |
|---|---|---|---|---|
| | C/2 | 2.34 | 371 | 842 |
| | 1C | 2.15 | 336 | 729 |
| | 2C | 2.05 | 241 | 505 |
| | 5C | 1.56 | 93 | 123 |

Statements Regarding Incorporation by Reference and Variations

All references throughout this application, for example, patent documents including issued or granted patents or equivalents; patent application publications; unpublished patent applications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Any appendix or appendices hereto are incorporated by reference as part of the specification and/or drawings.

Where the terms "comprise", "comprises", "comprised", or "comprising" are used herein, they are to be interpreted as specifying the presence of the stated features, integers, steps, or components referred to, but not to preclude the presence or addition of one or more other feature, integer, step, component, or group thereof. Separate embodiments of the invention are also intended to be encompassed wherein the terms "comprising" or "comprise(s)" or "comprised" are optionally replaced with the terms, analogous in grammar, e.g.; "consisting/consist(s)" or "consisting essentially of/consist(s) essentially of" to thereby describe further embodiments that are not necessarily coextensive.

The invention has been described with reference to various specific and preferred embodiments and techniques. However, it should be understood that many variations and modifications may be made while remaining within the spirit and scope of the invention. It will be apparent to one of ordinary skill in the art that compositions, methods, devices, device elements, materials, procedures and techniques other than those specifically described herein can be applied to the practice of the invention as broadly disclosed herein without resort to undue experimentation. All art-known functional equivalents of compositions, methods, devices, device elements, materials, procedures and techniques described herein are intended to be encompassed by this invention. Whenever a range is disclosed, all subranges and individual values are intended to be encompassed as if separately set forth. This invention is not to be limited by the embodiments disclosed, including any shown in the drawings or exemplified in the specification, which are given by way of example or illustration and not of limitation. The scope of the invention shall be limited only by the claims.

REFERENCES

Hamwi A.; *J. Phys. Chem. Solids,* 1996, 57(6-8), 677-688.
Nakajima T.; Watanabe N. *Graphite fluorides and Carbon-Fluorine compounds,* 1991, CRC Press, Boston.
Kita Y.; Watanabe N.; Fujii Y.; *J. Am. Chem. Soc.,* 1979, 101, 3832.
Hamwi A.; Alvergnat, H.; Bonnamy S.; Béguin F.; *Carbon* 1997, 35, 723.
Nakajima T.; Kasamatsu S.; Matsuno Y.; *Eur. J. Solid. State Inorg. Chem.* 1996, 33, 831.
Hamwi A.; Gendraud P.; Gaucher H.; Bonnamy S.; Béguin F.; *Mol. Cryst. Liq. Cryst.* 1998, 310, 185.
Touhara H.; Inahara J.; Mizuno T.; Yokoyama Y.; Okanao S.; Yanagiuch K.; Mukopadhyay I.; Kawasaki S.; Okino F.; Shirai H.; Xu W. H.; Kyotani T.; Tonita A.; *J. Fluorine Chem.* 2002, 114, 181.
Mickelson E. T.; Huffman C. B.; Rinzler A. G.; Smalley R. E.; Hauge R. H.; Margrave J. L.; *Chem. Phys. Lett.* 1998, 296, 88.
Kelly K. F.; Chiang I. W.; Mickelson E. T.; Hauge R.; Margrave J. L.; Wang X.; Scueria G. E.; Radloff C.; Halas N. J.; *Chem. Phys. Lett* 1999, 313, 445.
Basire C.; Ivanov D. A.; *Phys. Rev. Lett.* 2000, 85, 5587.
Press W. H.; *Numerical Recipes in C, The Art of Scientific Computing,* 1988, Plenum Press, New York)
Dubois M.; Giraudet J.; Guérin K.; Hamwi A.; Fawal Z.; Pirofte P.; Masin F.; *J. Phys. Chem. B* 2006, 110, 11800.
Okotrub A. V.; Yudanov N. F.; Chuvilin A. L.; Asanov I. P.; Shubin Y. V.; Bulusheva L. G.;
Gusel'nikov A. V.; Fyodorov I. S.; *Chem. Phys. Lett.* 2000, 323, 231.
Osswald S.; Flahaut E.; Ye H.; Gogotsi Y.; *Chem. Phys. Lett.* 2005, 402, 422.
Rao A. M.; Fung A. W. P.; di Vittorio S. L.; Dresselhaus M. S.; Dresselhaus G.; Endo M.; Oshida K.; Nakajima T.; *Phys. Rev. B* 1992, 45, 6883.
Chien T. C.; Dresselhaus M. S.; Endo M. *Phys. Rev. B* 1982, 26, 5867.
Knight D. D.; White W. S.; *J. Mater. Res.* 1989, 4, 385.
Panich A. M.; *Synth. Metals* 1999, 100, 169.
Touhara H.; Okino F.; *Carbon* 2000, 38, 241.
Panich A. M.; Shames A. I.; Nakajima T.; *J. Phys. Chem. Solids* 2001, 62, 959.
Krawietz T. R.; Haw J. F.; *Chem. Commun.* 1998, 19, 2151.
Dubois M.; Guérin K.; Pinheiro J. P.; Fawal Z.; Masin F.; Hamwi A.; *Carbon* 2004, 42, 1931.
Giraudet J.; Dubois M.; Guérin K.; Pinheiro J. P.; Hamwi A.; Stone W. E. E.; Pirotte P.; Masin F.; *J. Solid State Chem.* 2005, 118, 1262.
Hagaman E. W.; Murray D. K.; CuI G. D. D.; *Energy & Fuel* 1998, 12, 399.
Giraudet J.; Dubois M.; Guérin K.; Hamwi A.; Masin F.; *J. Phys. Chem. Solids* 2006, 67(5-6), 1100.
Blumberg W. E.; *Phys. Rev.* 1960, 119, 79.
Wilkie C. A.; Yu G.; Haworth D. T.; *J. Solid Sate Chem.* 1979, 30, 197.
Watanabe N.; *Physica B* 1981, 105, 17.
Sato Y.; Itoh K.; Hagiwara R.; Fukunaga T.; Ito Y.; *Carbon* 2004, 42, 3243.
Duijvestjn M. J.; Van der Lugt C.; Smidt J.; Wind R. A.; Zilm K. W.; Staplin D. C.; *Chem. Phys. Lett.* 1983, 102, 25.
Giraudet J.; Dubois M.; Hamwi A.; Stone W. E. E.; Pirotte P.; Masin F.; *J. Phys. Chem. B* 2005, 109, 175.
Bertani P.; Raya J.; Reinheimer P.; Gougeon R.; Delmotte L.; Hirschinger J.; *Solid State Magn. Res.* 1999, 13, 219.
Yokomichi H.; Morigaki K.; *J. Non-Cryst. Solids* 2000, 266, 797.
Yokomichi H.; Hayashi T.; Amano T.; Masuda A.; *J. Non-Cryst. Solids* 1998, 227, 641.
Takai K.; Sato H.; Enoki T.; Yoshida N.; Okino F.; Touhara H.; Endo M.; *Mol. Cryst. Liq. Cryst.* 2000, 340, 289.
Kupta V.; Nakajima T.; Ohzawa Y.; Žemva B.; *J. Fluorine Chem.* 2003, 120, 143.

V. N. Mittkin, *J. Structural Chemistry,* 2003, Vol. 44, 82-115, translated from *Zhurnal Structunoi Khimii,* 2003, Vol. 44, 99-138.

I. Mochida et al., *Carbon,* 2000, 38, 305-328.

J. Yang et al., *Fuel Processing Technology,* 2002, 70, 207-215.

S. Bonamy, *Carbon,* 1999, 37, 1691-1705.

S. Bonaly, *Carbon,* 1999, 37, 1707-1724.

A. Oberlin in *Chemistry and Physics of Carbon,* P. A. Thrower, ed., Vol. 22, New York, Marcel Dekker, 1989, 1-143.

We claim:

1. A subfluorinated graphite material having an average chemical composition CFx in which $0.63 \leq x \leq 0.95$, and comprising
    i) carbon strongly bound to fluorine and carbon weakly bound to fluorine or
    ii) carbon strongly bound to fluorine, carbon weakly bound to fluorine and unfluorinated carbon,
    wherein the relative amount of unfluorinated carbon and carbon weakly bound to fluorine is greater than or equal to 5% and less than 37% and $^{13}C$ nuclear magnetic resonance spectroscopy analysis of the subfluorinated graphite material provides a spectrum comprising a chemical shift peak centered from 130 to 150 ppm relative to TMS, a chemical shift peak centered at 84 to 89 ppm relative to TMS, and a chemical shift peak centered at 43 to 49 ppm relative to TMS.

2. The subfluorinated graphite material of claim 1, wherein $0.66 \leq x \leq 0.95$.

3. The subfluorinated graphite material of claim 2, wherein $0.7 \leq x \leq 0.95$.

4. The subfluorinated graphite material of claim 1, wherein the spectrum comprises a chemical shift peak centered at approximately 140 ppm relative to TMS.

5. The subfluorinated graphite material of claim 1, wherein the relative amount of unfluorinated carbon and carbon weakly bound to fluorine is greater than or equal to 10% and less than or equal to 20%.

6. An electrochemical device comprising an anode, a cathode, and an ion-transporting material therebetween, wherein the cathode comprises a subfluorinated graphite material according to claim 1.

7. The electrochemical device of claim 6, wherein $0.66 \leq x \leq 0.95$.

8. The electrochemical device of claim 7, wherein $0.7 \leq x \leq 0.95$.

9. The electrochemical device of claim 6, wherein the relative amount of unfluorinated carbon and carbon weakly bound to fluorine is greater than or equal to 10% and less than or equal to 20%.

10. An electrochemical device of claim 6, wherein the $^{13}C$ NMR spectrum comprises a chemical shift peak centered at approximately 140 ppm relative to TMS.

11. The device of claim 6, wherein the anode comprises a source of ions of a metal selected from Groups 1, 2, and 3 of the Periodic Table of Elements.

12. The device of claim 11, wherein the ions are lithium ions.

13. The electrochemical device of claim 6, wherein an x-ray diffraction spectrum of the subfluorinated graphite does not comprise a substantial peak at $2\theta$ in the range 26.3-26.4 degrees, using CuK$\alpha$ radiation.

14. The electrochemical cell of claim 6, wherein the subfluorinated graphite material is present in a composition containing a conductive diluent and a binder, the subfluorinated graphite material representing about 70 wt % to about 90 wt % of the composition.

15. A method for making a subfluorinated carbonaceous material, the method comprising the steps of
    a. providing graphite particles;
    b. exposing the graphite particles to a flowing gaseous source of elemental fluorine;
    c. heating the graphite particles to a selected reaction temperature, the selected temperature being between 330° C. and 600° C., wherein the average size of the particles is between 2 microns and 200 microns; and
    d. maintaining the graphite particles at the selected temperature for a time between 2 hours and 30 hours to obtain a subfluorinated graphite material having an average chemical composition $CF_x$ in which $0.63 < x \leq 0.95$ and comprising
    i). carbon strongly bound to fluorine and carbon weakly bound to fluorine or
    ii) carbon strongly bound to fluorine, carbon weakly bound to fluorine and unfluorinated carbon,
    wherein the relative amount of unfluorinated carbon and carbon weakly bound to fluorine is greater than or equal to 5% and less than 37% and $^{13}C$ nuclear magnetic resonance spectroscopy analysis of the subfluorinated graphite material provides a spectrum comprising a chemical shift peak centered from 130 to 150 ppm relative to TMS, a chemical shift peak centered at 84 to 89 ppm relative to TMS, and a chemical shift peak centered at 43 to 49 ppm relative to TMS.

16. The method of claim 15, wherein the graphite particles are held at the selected temperature for a time between 8 and 20 hours.

* * * * *